(12) United States Patent
Koike et al.

(10) Patent No.: US 9,594,275 B2
(45) Date of Patent: Mar. 14, 2017

(54) RETARDATION ELEMENT, LIQUID CRYSTAL DISPLAY DEVICE, AND PROJECTION DISPLAY DEVICE

(71) Applicant: DEXERIALS CORPORATION, Tokyo (JP)

(72) Inventors: Nobuyuki Koike, Tokyo (JP); Akio Takada, Tokyo (JP); Naoki Hanashima, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 205 days.

(21) Appl. No.: 14/494,255

(22) Filed: Sep. 23, 2014

(65) Prior Publication Data
US 2015/0092117 A1 Apr. 2, 2015

(30) Foreign Application Priority Data

Sep. 27, 2013 (JP) ................................ 2013-201849

(51) Int. Cl.
*G02F 1/1335* (2006.01)
*G02F 1/13363* (2006.01)
(Continued)

(52) U.S. Cl.
CPC ..... *G02F 1/133634* (2013.01); *G02B 5/3041* (2013.01); *G02B 5/3083* (2013.01);
(Continued)

(58) Field of Classification Search
CPC .... G02B 5/3083; G02B 5/3016; G02B 5/305; G02B 27/28; G02B 5/285; G02F 1/13363;
(Continued)

(56) References Cited

U.S. PATENT DOCUMENTS 8,208,079 B2 6/2012 Tsukagoshi
8,488,091 B2 * 7/2013 Sakai ................... G02B 5/3016
349/118

(Continued)

FOREIGN PATENT DOCUMENTS

JP 2005-172984 A 6/2005
JP 2005-292781 A 10/2005
(Continued)

OTHER PUBLICATIONS

Motohiro and Taga, "Thin film retardation plate by oblique deposition", Applied Optics, Jul. 1, 1989, pp. 2466-2482, vol. 28-issue No. 13.

(Continued)

*Primary Examiner* — Huyen Ngo
(74) *Attorney, Agent, or Firm* — Pergament & Cepeda LLP; Milagros A. Cepeda; Edward D. Pergament

(57) ABSTRACT

The present application provides a retardation element, having a first birefringent layer; and a second birefringent layer which has approximately the same average thickness as that of the first birefringent layer and contacts the first birefringent layer such that an angle formed between a first line segment representing the principal axis of refractive index anisotropy of the first birefringent layer and a second line segment representing the principal axis of refractive index anisotropy of the second birefringent layer is neither 0° nor 180° when the first line segment and the second line segment are projected on the transparent substrate such that an end A of the first line segment at a side of the transparent substrate and an end B of the second line segment at a side of the transparent substrate coincide with each other.

18 Claims, 14 Drawing Sheets

(51) Int. Cl.
*G02B 5/30* (2006.01)
*G02F 1/139* (2006.01)
*G02B 1/115* (2015.01)

(52) U.S. Cl.
CPC ...... *G02F 1/1397* (2013.01); *G02F 1/133632* (2013.01); *B32B 2457/202* (2013.01); *G02B 1/115* (2013.01); *G02F 2413/02* (2013.01); *G02F 2413/06* (2013.01)

(58) Field of Classification Search
CPC ............. G02F 1/133634; G02F 1/1393; Y10T 428/24942
See application file for complete search history.

(56) References Cited

U.S. PATENT DOCUMENTS

| | | | |
|---|---|---|---|
| 2006/0203159 A1* | 9/2006 | Kawamoto | G02B 5/3016 349/117 |
| 2007/0076133 A1 | 4/2007 | Shimizu et al. | |
| 2007/0182894 A1 | 8/2007 | Nakagawa et al. | |
| 2008/0043158 A1 | 2/2008 | Shirasaka et al. | |
| 2013/0094085 A1* | 4/2013 | Merrill | G02B 5/3083 359/489.07 |
| 2015/0109557 A1* | 4/2015 | Koike | G02B 5/3083 349/61 |

FOREIGN PATENT DOCUMENTS

| | | |
|---|---|---|
| JP | 2006-011298 A | 1/2006 |
| JP | 2006-171327 A | 6/2006 |
| JP | 2007-101764 A | 4/2007 |
| JP | 2009-145863 A | 7/2009 |
| JP | 2009-229804 A | 10/2009 |
| JP | 4566275 B2 | 10/2010 |
| WO | 2008/081919 A1 | 7/2008 |
| WO | 2009/001799 A1 | 12/2008 |

OTHER PUBLICATIONS

Notice of Reasons for Rejection mailed on Mar. 29, 2016, by the Japanese Patent Office, for corresponding Patent Application No. JP 2013-201849. (With English Translation).

* cited by examiner

RETARDATION ELEMENT, LIQUID CRYSTAL DISPLAY DEVICE, AND PROJECTION DISPLAY DEVICE

CROSS-REFERENCE TO RELATED APPLICATION

This application claims priority to Japanese Patent Application No. 2013-201849, filed Sep. 27, 2013, the entire contents of which are incorporated herein by reference.

BACKGROUND OF THE INVENTION

Field of the Invention

The present invention relates to a retardation element, a liquid crystal display device, and a projection display device.

Description of the Related Art

In recent years, an optical compensation technique utilizing a retardation element has been applied to liquid crystal display devices in order to improve a contrast property and a viewing angle property. Examples include black luminance correction in a vertically aligned liquid crystal. In order to correct polarization disturbance due to a pretilt angle of a liquid crystal, birefringence of oblique incident light, or the like, there are considered a method of performing optical compensation by placing a retardation element made of crystal or the like in parallel with a surface of a liquid crystal panel, and a method of performing optical compensation by placing an organic material having a birefringence such as a polymer film in parallel with a surface of a liquid crystal panel (see Japanese Patent Application Laid-Open (JP-A) Nos. 2005-172984 and 2007-101764, and Japanese Patent (JP-B) No. 4566275).

However, in a method of machining a monocrystal as a retardation element, in particular, with a view to performing compensation taking into account even a pretilt angle of a liquid crystal, it is necessary to cut out the monocrystal at a predetermined angle from the crystal axis. This necessitates a very high level precision in cutting, polishing, etc. of the material, and high costs are required to realize such a precision. Furthermore, axis control is not easy with a stretched film or the like.

Hence, there is considered a method of placing a retardation element itself to be inclined from a liquid crystal panel (see JP-A Nos. 2006-11298 and 2009-229804).

However, there is a risk of shortage of space needed for the inclination in projectors that are becoming increasingly smaller in size. Furthermore, there is a problem in durability, with susceptibility to deterioration due to heat and UV rays.

Meanwhile, as a retardation element to which thin film formation by oblique deposition of dielectric materials is applied, there is proposed a retardation compensation element in which a negative C-plate formed of alternately stacked layers of high and low refractive index materials, and an O-plate formed of two or more obliquely deposited films are combined (see JP-A No. 2006-171327). This technique proposes a retardation element that compensates for disturbance in polarization of oblique incident light incident to an optical modulator with the negative C-plate having a structural birefringence based on the alternately stacked layers of high and low refractive index materials, and compensates for disturbance in polarization caused by a pretilt angle with the O-plate formed of two or more obliquely deposited films.

However, it is necessary to stack a total of eighty layers in order to produce a negative C-plate, and it is also necessary to provide an antireflection layer separately, which raises concerns about high costs and a long lead time.

There is also proposed an optical compensation method utilizing two retardation plates formed of obliquely deposited films (see JP-A No. 2009-145863). According to this proposed technique, each retardation plate is rotated in the in-plane direction to be at a position of an optimal related angle, which is expected to improve the contrast.

However, there are concerns about high costs and expansion of the mounting space, because two retardation plates are used and a rotation mechanism is necessary.

There is also proposed a retardation plate that is used with a super twisted nematic (STN) liquid crystal device, and formed of multiple layers of inorganic thin films obliquely deposited from different angular positions that are shifted in the in-plane direction of the substrate, which is the deposition direction, at constant angular intervals by the same degrees as the angle of twist of the STN liquid crystal device (see JP-A No. 2006-171327).

According to this method, it is necessary to perform deposition from multiple angular positions in order to reproduce the twist of the STN liquid crystal device by deposition, which requires special deposition equipment and raises concerns about increase of a lead time due to the multilayer structure. There is also a fundamental problem that this technique cannot be used for other than STN liquid crystal devices.

There is also proposed a liquid crystal display device using a retardation plate including at least two retardation compensation layers arranged such that their layer surfaces face each other, such that they have different retardation values, and such that their optical axes, which correspond to the fast axis or the slow axis of the constituent material of the retardation compensation layers, are directionally varied in the plane of the layer surfaces (see International Publication No. WO2008/081919).

However, this proposed technique requires an adhesive because the two compensation layers are formed by sticking, which raises a problem in heat resistance. This technique also requires two substrates, and raises concerns about high costs.

Hence, it is currently requested to provide a retardation element, a liquid crystal display device, and a projection display device that can effectively and highly precisely compensate for characteristic changes of normal incident light, and characteristic changes of oblique incident light due to the thickness of a liquid crystal layer, can greatly save the installation space, and are also excellent in durability.

SUMMARY OF THE INVENTION

The present invention aims to solve the conventional problems described above and to achieve the following object. That is, an object of the present invention is to provide a retardation element and a production method thereof, a liquid crystal display device and a production method thereof, and a projection display device that can effectively and highly precisely compensate for characteristic changes of normal incident light, and characteristic changes of oblique incident light due to the thickness of a liquid crystal layer, can greatly save the installation space, and are also excellent in durability.

Means for solving the problems is as follows.

In one aspect, the present invention provides a retardation element, including:
- a transparent substrate;
- a retardation imparting antireflection layer formed of an optical multilayer film, and configured to impart a retardation to an oblique incident light ray among incident light rays, and to prevent the incident light rays from being reflected;
- a first birefringent layer containing an optically anisotropic inorganic material, wherein an angle formed between a principal axis of refractive index anisotropy of the optically anisotropic inorganic material and a surface of the transparent substrate is not 90°; and
- a second birefringent layer containing an optically anisotropic inorganic material, wherein an angle formed between a principal axis of refractive index anisotropy of the optically anisotropic inorganic material and the surface of the transparent substrate is not 90°,
- wherein the second birefringent layer contacts the first birefringent layer such that an angle formed between a first line segment representing the principal axis of refractive index anisotropy of the first birefringent layer and a second line segment representing the principal axis of refractive index anisotropy of the second birefringent layer is neither 0° nor 180° when the first line segment and the second line segment are projected on the transparent substrate such that an end A of the first line segment at a side of the transparent substrate and an end B of the second line segment at a side of the transparent substrate coincide with each other, and
- wherein the second birefringent layer has an average thickness approximately equal to an average thickness of the first birefringent layer.

In one variant, the present invention provides a retardation element according to the present invention,
wherein the optically anisotropic inorganic material of the first birefringent layer is an oxide containing Si, Nb, Zr, Ti, La, Ta, or Al, or any combination thereof, and
wherein the optically anisotropic inorganic material of the second birefringent layer is an oxide containing Si, Nb, Zr, Ti, La, Ta, or Al, or any combination thereof.

In one variant, the present invention provides a retardation element according to the present invention,
wherein the first birefringent layer, the second birefringent layer, or both satisfy the following formula: Nx>Ny>Nz, where Nx represents a refractive index in a direction parallel with the principal axis of refractive index anisotropy, Ny represents a refractive index in a direction perpendicular to Nx, and Nz represents a refractive index in a direction perpendicular to Nx and Ny.

In one variant, the present invention provides a retardation element according to the present invention,
wherein the angle formed between the first line segment and the second line segment projected on the transparent substrate is 70° or greater but less than 90°.

In one variant, the present invention provides a retardation element according to the present invention,
wherein a difference between a retardation of the first birefringent layer and a retardation of the second birefringent layer is less than 10 nm.

In one variant, the present invention provides a retardation element according to the present invention,
wherein the retardation of the first birefringent layer and the retardation of the second birefringent layer are approximately equal to each other.

In one variant, the present invention provides a retardation element according to the present invention,
wherein layers of the optical multilayer film have different average thicknesses.

In one variant, the present invention provides a retardation element according to the present invention,
wherein the retardation imparting antireflection layer imparts a retardation of 28 nm or less to an oblique incident light ray inclined by 15° from a direction perpendicular to the transparent substrate.

In one variant, the present invention provides a retardation element according to the present invention,
wherein materials of layers of the optical multilayer film are each an oxide containing Si, Nb, Zr, Ti, La, Ta, or Al, or any combination thereof.

In one variant, the present invention provides a retardation element according to the present invention,
wherein the retardation imparting antireflection layer functions as an antireflection layer in a wavelength range of from 430 nm to 510 nm.

In one variant, the present invention provides a retardation element according to the present invention,
wherein the retardation imparting antireflection layer functions as an antireflection layer in a wavelength range of from 510 nm to 590 nm.

In one variant, the present invention provides a retardation element according to the present invention,
wherein the retardation imparting antireflection layer functions as an antireflection layer in a wavelength range of from 590 nm to 680 nm.

In one variant, the present invention provides a retardation element according to any one of the present invention,
wherein an angle formed between a bisector of the angle formed between the first line segment and the second line segment projected on the transparent substrate and one side of the transparent substrate is approximately 45°.

In one aspect, the present invention provides a liquid crystal display device, including:
- a liquid crystal panel including a substrate and a VA mode liquid crystal layer containing liquid crystal molecules having a pretilt from a direction perpendicular to a principal surface of the substrate, the liquid crystal panel configured to modulate an incident flux of light;
- a first polarizer disposed on an incident side of the liquid crystal panel;
- a second polarizer disposed on an emission side of the liquid crystal panel; and
- the retardation element according to the present invention disposed on an optical path between the liquid crystal panel and the second polarizer.

In one variant, the present invention provides a liquid crystal display device according to the present invention,
wherein an imaginary line projected on the transparent substrate and representing a direction of inclination of the liquid crystal molecules from the direction perpendicular to a surface of the substrate due to the pretilt, and the bisector of the angle formed between the first line segment and the second line segment projected on the transparent substrate are approximately parallel with each other.

In one aspect, the present invention provides a projection display device, including:
- a light source configured to emit light;
- a projection optical system configured to project modulated light; and the liquid crystal display device according to the present invention disposed on an optical path between the light source and the projection optical system.

In one variant, the present invention provides a method for producing the retardation element according to the present invention, including:

forming the first birefringent layer over any of the transparent substrate and the retardation imparting antireflection layer by oblique deposition; and forming the second birefringent layer over the first birefringent layer by oblique deposition.

In one variant, the present invention provides a method for producing the liquid crystal display device according to the present invention, including:

the method for producing the retardation element according to the present invention and disposing the retardation element on an optical path between the liquid crystal panel and the second polarizer such that one side of the substrate of the liquid crystal panel and one side of the retardation element approximately coincide with each other.

The present invention can provide a retardation element and a production method thereof, a liquid crystal display device and a production method thereof, and a projection display device that can solve the conventional problems described above, achieve the object described above, can effectively and highly precisely compensate for characteristic changes of normal incident light, and characteristic changes of oblique incident light due to the thickness of a liquid crystal layer, can greatly save the installation space, and are also excellent in durability.

DETAILED DESCRIPTION OF THE INVENTION

Retardation Element and Production Method Thereof

Figure 1:
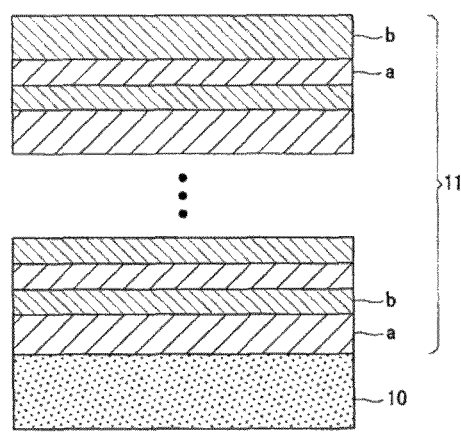
FIG. 1 is a cross-sectional diagram exemplarily showing an example of a Rd-AR layer.

A retardation element of the present invention includes at least a transparent substrate, a retardation imparting antireflection layer, a first birefringent layer, and a second birefringent layer, and further includes other members according to necessity.

A retardation element production method of the present invention is a method for producing the retardation element of the present invention, includes at least a first birefringent layer forming step and a second birefringent layer forming step, and further includes other steps according to necessity.

The first birefringent layer forming step is a step of forming a first birefringent layer over any of the transparent substrate and the retardation imparting antireflection layer by oblique deposition.

The second birefringent layer forming step is a step of forming a second birefringent layer over the first birefringent layer by oblique deposition.

In the following, through explanation of each member of the retardation element, the method for producing the retardation element of the present invention will also be explained.

In the present invention, normal incident light means light incident to a liquid crystal panel and the retardation element perpendicularly thereto. Oblique incident light means light incident thereto at a certain angle from the normal incident light.

Transparent Substrate

The transparent substrate is not particularly limited, and an arbitrary transparent substrate may be selected according to the purpose, as long as it has light transmissivity to light in a wavelength range to be used.

The material of the transparent substrate is not particularly limited, and may be appropriately selected according to the purpose. Examples thereof include glass, quartz, and crystal.

The shape of the transparent substrate is not particularly limited, and may be appropriately selected according to the purpose. However, it is preferably a quadrangle.

The average thickness of the transparent substrate is not particularly limited, and may be appropriately selected according to the purpose. However, it is preferably from 0.1 mm to 3.0 mm, and more preferably from 0.1 mm to 2.0 mm in terms of preventing warpage of the substrate.

Retardation Imparting Antireflection Layer

The retardation imparting antireflection layer is not particularly limited, and an appropriate retardation imparting antireflection layer may be selected according to the purpose, as long as it is a layer formed of an optical multilayer film, and is configured to impart a retardation to an oblique incident light ray among incident light rays, and to prevent the incident light rays from being reflected.

The material of the layers of the optical multilayer film is not particularly limited, and may be appropriately selected according to the purpose. However, it is preferably an oxide containing Si, Nb, Zr, Ti, La, Ta, or Al, or any combination thereof.

It is preferable that the layers of the optical multilayer film have different average thicknesses. This makes it possible to obtain a sufficient antireflection function.

The average thicknesses of the respective layers, the average layer of the optical multilayer film, and the average thickness of a dielectric multilayer film may hereinafter be referred to as film thickness.

It is preferable that the retardation imparting antireflection layer impart a retardation of 28 nm or less to oblique incident light that is inclined by 15° from a direction perpendicular to the transparent substrate.

Conventionally, optical multilayer films called structural birefringence have not utilized the effect of interference of light in order to produce a retardation Rth in the direction of the film thickness. For example, when approximately a hundred layers, each of which is formed of a stack of two kinds of dielectric films a and b, are stacked, all of the dielectric films a have the same film thickness to in the multilayer film, and all of the dielectric films b also have the same film thickness tb in the multilayer film. For example, in a technique of International Publication No. WO2009/001799, all dielectric films have a film thickness of 15 nm. Such a conventional optical multilayer film needs to be provided separately with an antireflection film on both sides thereof.

On the other hand, the retardation imparting antireflection layer of the present invention functions also as an antireflection film by utilizing a retardation produced due to oblique incidence to a dielectric film, and positively utilizing also the effect of interference of light positively. That is, the retardation imparting antireflection layer by itself enables engineering of the retardation of oblique incident light, which is difficult for the first birefringent layer and the second birefringent layer to control, and also has an antireflection function.

Further, the retardation imparting antireflection layer needs not have the same average thickness in the respective layers thereof, and can save the number of layers stacked to a relatively small number. Specifically, it is preferable that almost all of the layers have different average thicknesses, and that the number of layers stacked be optimized. This is fundamentally different from the conventional design concept. The retardation imparting antireflection film will hereinafter be referred to also as Rd-AR layer.

FIG. 1 is a cross-sectional diagram exemplarily showing an example of a Rd-AR layer. As shown in FIG. 1, the Rd-AR layer 11 is a dielectric multilayer film in which dielectric films a having a high refractive index and dielectric films b having a low refractive index are alternately stacked over a transparent substrate 10.

The Rd-AR layer should have an antireflection function in a desired wavelength range, and should impart an arbitrary retardation to oblique incident light having a predetermined angle. Therefore, it requires engineering for antireflection, and at the same time, engineering for retardation of oblique incident light.

The Rd-AR layer can also be engineered for a visible light range. However, it is preferable that the Rd-AR layer be engineered for the wavelength range of each of the three primary colors respectively, namely, a red wavelength range (e.g., from 590 nm to 680 nm), a green wavelength range (e.g., from 510 nm to 590 nm), and a blue wavelength range (e.g., from 430 nm to 510 nm). A dielectric material has wavelength dispersion of the refractive index, and oblique incident light also has wavelength dispersion of the retardation. Therefore, it is difficult to engineer a constant retardation in the visible light range. However, splitting into the three primary colors of RGB makes it possible to suppress the wavelength dispersion of the retardation of oblique incident light, and to make antireflection engineering easy.

The dielectric material used in the Rd-AR layer may be an oxide such as $TiO_2$, $SiO_2$, $Ta_2O_5$, $Al_2O_3$, $CeO_2$, $ZrO_2$, $ZrO$, and $Nb_2O_5$, or a combination of these. $Nb_2O_5$ is used preferably as the dielectric film a having a high refractive index, and $SiO_2$ is used preferably as the dielectric film b having a low refractive index.

It is preferable that the average thickness to of the dielectric film a having a high refractive index and the average thickness tb of the dielectric film b having a low refractive index both satisfy a relationship of $\lambda/100 \le ta, tb \le \lambda/2$, where $\lambda$ is a used wavelength. By adjusting the average thickness to $\lambda/2$ or less, it is possible to control the sign of a retardation Rd produced by oblique incidence to the dielectric film to be constant. By adjusting the average thickness to $\lambda/100$ or greater, it is possible to express a retardation.

It is preferable that the number of layers of dielectric films d satisfy a relationship of 8≤b≤1,000. When the number of layers of dielectric films d is less than 8, the wavelength dispersion of the retardation Rd may be large. When the number of layers of dielectric films d is greater than 1,000, a lead time may be long.

It is preferable that almost all of the dielectric films have different average thicknesses. In order to form an antireflection layer by providing it with an arbitrary retardation Rd, it is important to finely adjust the average thicknesses of the respective layers and to positively utilize interference of light.

Figure 2:
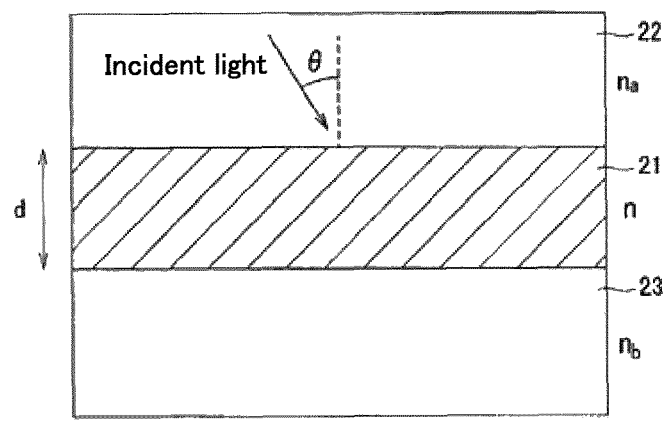
FIG. 2 is a cross-sectional diagram showing an example of an optical thin film.

The average thickness of the dielectric films will be explained below more specifically. FIG. 2 is a cross-sectional diagram showing an example of an optical thin film. The optical thin film 21 has an average thickness d and a refractive index n, and is sandwiched between a medium 22 having a refractive index na and a medium 23 having a refractive index nb.

Here, neither of the media is absorptive. When light is incident from the side of the medium 22, the light has Fresnel coefficients $r_{pa}$, $r_{sa}$, $t_{pa}$, and $t_{sa}$ at the first interface to which it is incident at an incident angle θ, and has Fresnel coefficients $r_{pb}$, $r_{sb}$, $t_{pb}$, and $t_{sb}$ at the second interface to the other medium 23. r represents a reflectivity coefficient, t represents a transmission coefficient, and p and s each represent polarization.

When it is assumed that the transmission coefficients of this single-layer optical thin film are $\tau^P$ and $\tau^s$, the transmission coefficients can be represented by the formula (1) below.

$$\tau^{p,s} = t_a t_b + t_a r_b r_a t_b \exp(i2\pi d \cos\phi/\lambda) + \cdots \quad (1)$$
$$= \frac{t_a t_b}{1 - r_a r_b \exp(i2\pi d \cos\phi/\lambda)}$$

There is also a relationship represented by the formula (2) below.

$$n_a \sin\theta = n \sin\phi \quad (2)$$

When it is assumed that the media are not absorptive, the Fresnel coefficients t and r are real numbers. When the formula (1) is rationalized, it turns to the formula (3) below.

$$\tau^{p,s} = \frac{t_a t_b (1 - r_a r_b \exp(-i2\pi d \cos\phi/\lambda))}{1 + r_a^2 r_b^2 - r_a r_b \cos(2\pi d \cos\phi/\lambda)} \quad (3)$$

Hence, the transmission coefficients $\tau^P$ and $\tau^s$ turn to the formulae (4) and (5) respectively.

$$\tau^P = \alpha \exp(i\delta) \quad (4)$$

$$\tau^s = \beta \exp(i\epsilon) \quad (5)$$

Note that α, δ, β, and ε are real numbers. When the incident angle is not 0, δ and ε are typically not 0. Further, as apparent from the formula (3) above, the values of δ and ε may vary depending on polarization because the values of t and r vary depending on polarization. That is, it can be said that the optical thin film functions so as to produce a retardation when the incident angle is other than 0.

Here, Fresnel coefficients $r^p_{01}$, $r^s_{01}$, $t^p_{01}$, and $t^s_{01}$ of p-polarized light and s-polarized light from one medium 0 to another medium 1 are as follows.

$$r^{p,s}_{01} = \frac{\eta^{p,s}_0 - \eta^{p,s}_1}{\eta^{p,s}_0 + \eta^{p,s}_1} \quad (6)$$

$$t^{p,s}_{01} = \frac{2\eta^{p,s}_0}{\eta^{p,s}_0 + \eta^{p,s}_1} \quad (7)$$

Note that there are relationships represented by the formulae (8) and (9) below.

$$\eta^p_{0,1} = \frac{n_{0,1}}{\cos\theta_{0,1}} \quad (8)$$

$$\eta^s_{0,1} = n_{0,1} \cos\theta_{0,1} \quad (9)$$

It is possible to calculate a retardation by assigning these to the formula (5) above.

Figure 3:
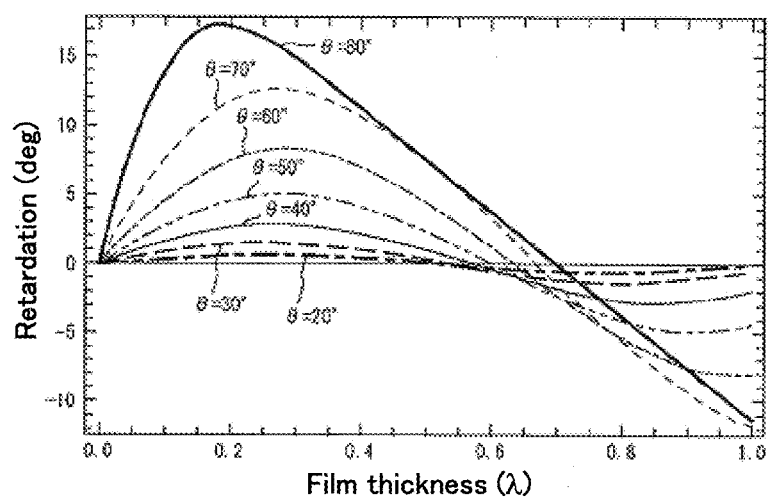
FIG. 3 is a graph showing dependency of a retardation on an optical film thickness when the angle of incident light A is varied in a structure in which refractive indices are 1/1.41/1.

For example, it is assumed that the structure of FIG. 2 has refractive indices na=nb=1, and n=1.41. In this case, dependency of a retardation on an optical film thickness when the angle θ of incident light is changed is as shown in the graph of FIG. 3. The retardation has the same sign as long as the optical film thickness is λ/2 or less. However, the sign of the retardation is inverted when the optical film thickness is λ/2 or greater, particularly when θ is small.

Figure 4:
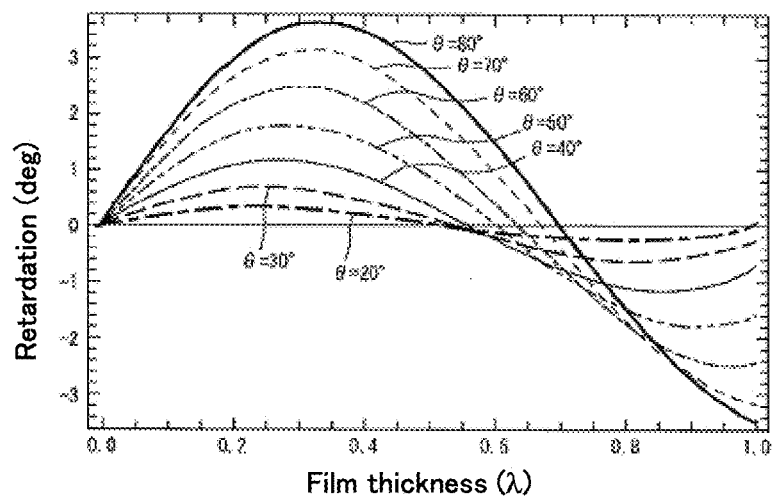
FIG. 4 is a graph showing dependency of a retardation on an optical film thickness when the angle of incident light A is varied in a structure in which refractive indices are 2/1.41/2.

Further, for example, it is assumed that the structure of FIG. 2 has refractive indices na=nb=2, and n=1.41. In this case, dependency of a retardation on an optical film thickness when the angle θ of incident light is changed is as shown in the graph of FIG. 4. The graph has a similar tendency to that of FIG. 3. The retardation has the same sign as long as the optical film thickness is λ/2 or less, and the sign of the retardation is inverted when the optical film thickness is λ/2 or greater, particularly when θ is small.

As understandable from the above, when dielectric films having relatively different refractive indices are stacked up to an optical film thickness of λ/2 or less, the sign of a retardation produced in light is unidirectional. Therefore, when controlling Rd by using a Rd-AR layer, it is preferable to adjust the optical film thickness to λ/2 or less. Further, as understandable from FIG. 3 and FIG. 4, it is not easy for a retardation to be produced when the optical film thickness is too small. Therefore, the optical film thickness is preferably λ/100 or greater.

Figure 5:
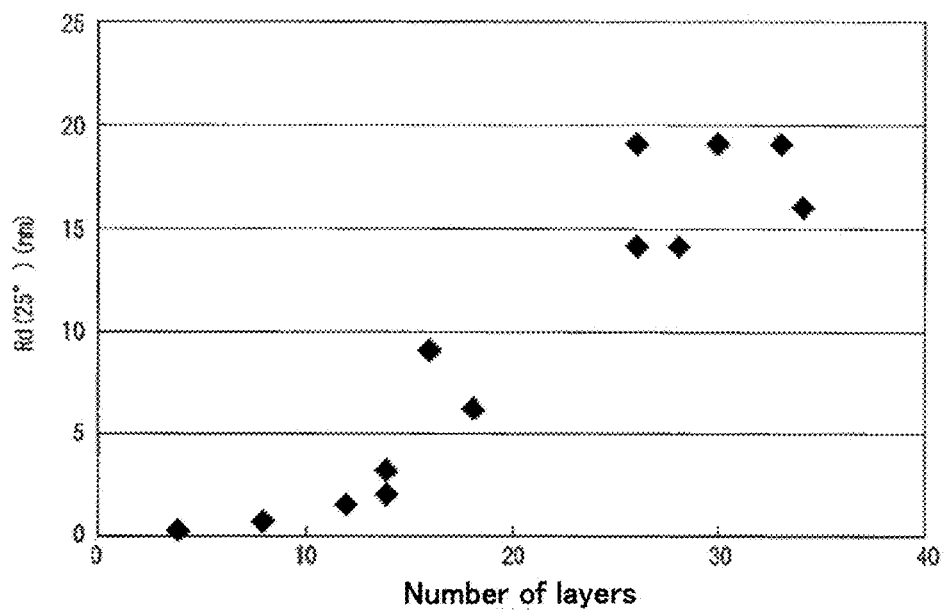
FIG. 5 is a graph showing dependency of a retardation Rd of oblique incident light on the number of layers in designing a Rd-AR layer.

Next, the number of layers of dielectric films of the Rd-AR layer will be explained more specifically. FIG. 5 shows the largest retardations Rd that can be imparted by dielectric multilayer films including different numbers of layers of films of from 4 to 36, respectively. The vertical axis represents absolute values of retardations. $Nb_2O_5$ is used as a dielectric film having a high refractive index, and $SiO_2$ is used as a dielectric film having a low refractive index. The incident angle of light is 25°. It can be understood from the graph of FIG. 5 that in designing a Rd-AR layer, the greater the number of layers of dielectric films, the greater the largest retardation Rd that can be imparted can be.

Figure 6:
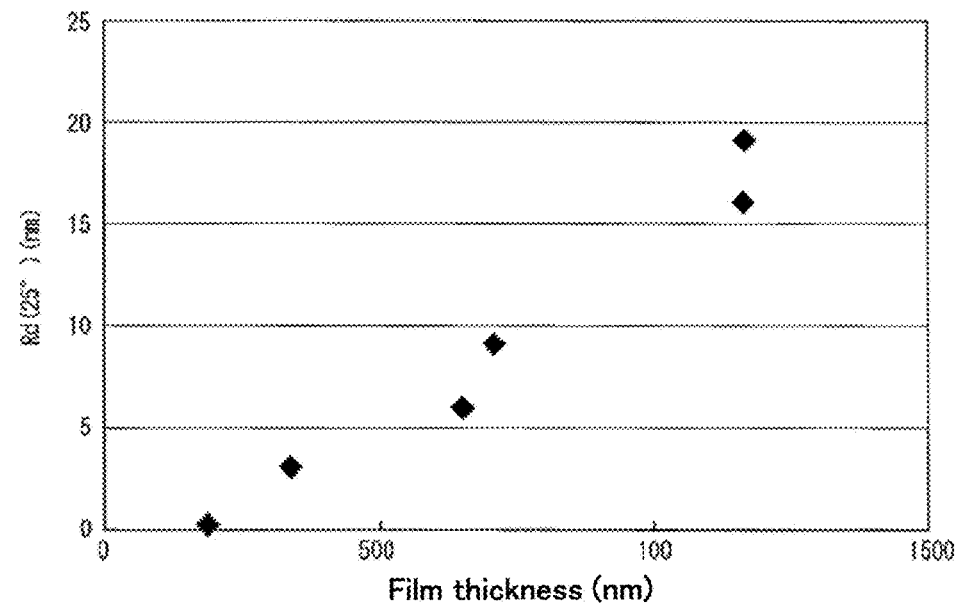
FIG. 6 is a graph showing dependency of a retardation Rd of oblique incident light on a film thickness in designing a Rd-AR layer.

FIG. 6 shows the largest retardations Rd that can be imparted by Rd-AR layers that are designed to have different total thicknesses of the layers of dielectric multilayer films of from 200 nm to 1,300 nm. The vertical axis represents absolute values of retardations. $Nb_2O_5$ is used as a dielectric film having a high refractive index, and $SiO_2$ is used as a dielectric film having a low refractive index. The incident angle of light is 25°. It can be understood from the graph of FIG. 6 that the greater the total thickness of the Rd-AR layer, the greater the largest retardation Rd that can be imparted can be.

Figure 7:
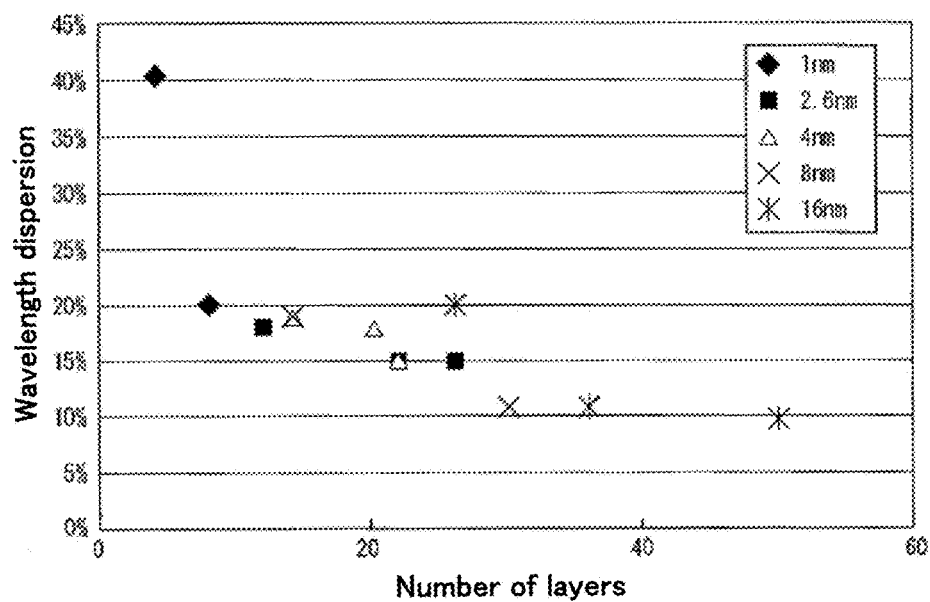
FIG. 7 is a graph showing a relationship between the number of stacked layers and wavelength dispersion of a retardation Rd in a blue wavelength range.

FIG. 7 is a graph showing a relationship between numbers of layers aiming for Rd (25°) of 1 nm, 2.6 nm, 4 nm, 8 nm, and 16 nm in a blue wavelength range, and wavelength dispersion of the retardation Rd. Wavelength dispersion represents dispersion of the retardation Rd within a predetermined wavelength range. It can be understood from the graph of FIG. 7 that when the number of layers is 8 or more, it is possible to produce a favorable retardation element that can suppress dispersion of Rd. Similar tendencies to that in the blue wavelength range can be obtained in a green wavelength range and a red wavelength range. Particularly, for a large retardation Rd to be imparted, it is possible to suppress dispersion by providing a large number of layers. Typically, an antireflection layer for a transparent substrate is formed of about 4 to 6 layers. However, it is preferable that the Rd-AR layer be formed of 8 or more layers for the reason described above.

Next, a dielectric multilayer film including a dielectric material having a relatively highest refractive index NH and a dielectric material having a relatively lowest refractive index NL will be explained.

It is preferable that in the Rd-AR layer, the relationship between a dielectric material having a relatively highest refractive index NH and a dielectric material having a relatively lowest refractive index NL satisfy the formula below.

$$0.4 < NH - NL < 1.5$$

Figure 8:
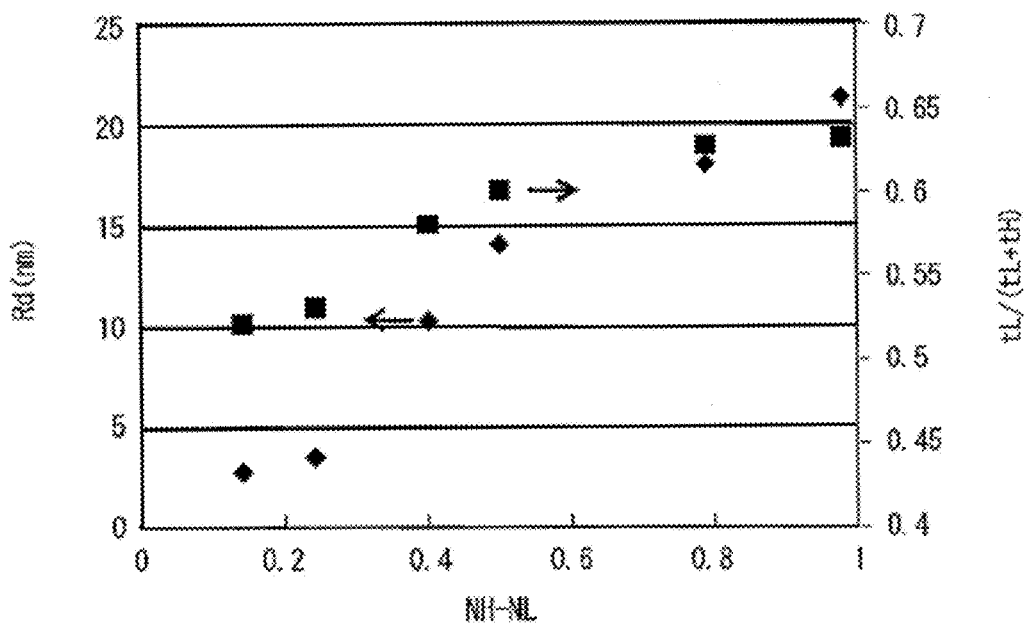
FIG. 8 is a graph showing a maximum retardation that can be imparted to 25° oblique incident light, when a dielectric multilayer film is formed with a dielectric material having a relatively highest refractive index NH and a dielectric material having a relatively lowest refractive index NL.

FIG. 8 is a graph showing the largest retardations that can be imparted to oblique incident light incident at 25° by dielectric multilayer films each formed of a dielectric material having a relatively highest refractive index NH and a dielectric material having a relatively lowest refractive index NL. The vertical axis represents absolute values of retardations. When NH−NL is 0.4 or greater, it is likely for a relatively large retardation Rd to be imparted. Meanwhile, when NH−NL is 1.5 or greater, there is a risk that the wavelength dispersion may be great.

Further, it is preferable that the Rd-AR layer satisfy $tL/(tH+tL) > 0.4$, where tH is the film thickness of a dielectric material having a relatively highest refractive index, and tL is the film thickness of a dielectric material having a relatively lowest refractive index. As shown together in FIG. 8, when forming a dielectric multilayer film by using a dielectric material having a relatively highest refractive index NH and a dielectric material having a relatively lowest refractive index NL so as for a largest retardation to be imparted to oblique incident light incident at 25°, it is necessary to satisfy $tL/(tH+tL) > 0.4$.

Figure 9:
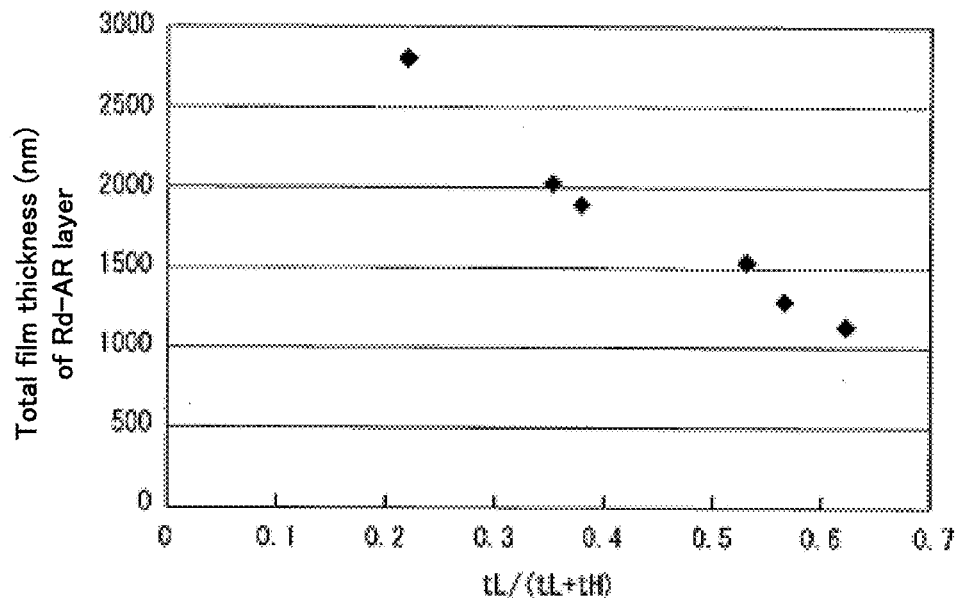
FIG. 9 is a graph showing a relationship between $tL/(tH+tL)$ and a film thickness, when a retardation of 18 nm is imparted to 25° oblique incident light.

FIG. 9 is a graph showing a relationship between $tL/(tH+tL)$ and a film thickness for when imparting a retardation of 18 nm to oblique incident light incident at 25°. It can be understood that the smaller the value of $tL/(tH+tL)$, the larger film thickness is required in order to realize an antireflection layer and retardation impartment at the same time. Therefore, it is preferable that $tL/(tH+tL) > 0.4$ be satisfied.

As explained above, the Rd-AR layer is a member for imparting a retardation to oblique incident light having a predetermined angle, and is not a member in which a dielectric multilayer film has such birefringence as represented by a negative C-plate, because a retardation imparted by the Rd-AR layer is not defined by birefringence. That is, the Rd-AR layer has a function of imparting an arbitrary retardation to light having a predetermined angle, without behaving as such an index ellipsoid as a negative C-plate. This function is sufficient for compensation of a retardation that is to occur in oblique incident light passing through vertically aligned liquid crystal molecules in an optical modulator.

First Birefringent Layer and Second Birefringent Layer

The first birefringent layer contains an optically anisotropic inorganic material.

In the first birefringent layer, an angle formed between a principal axis of refractive index anisotropy of the optically anisotropic inorganic material and a surface of the transparent substrate is not 90°, and is preferably from 20° to 80°, and more preferably from 40° to 70°.

The angle formed between the principal axis and the surface of the transparent substrate typically can be either of two angles that total 180°. However, it means the angle smaller than 90°, here. This also applies hereinafter.

The second birefringent layer contains an optically anisotropic inorganic material.

In the second birefringent layer, an angle formed between a principal axis of refractive index anisotropy of the optically anisotropic inorganic material and a surface of the transparent substrate is not 90°, and is preferably from 20° to 80°, and more preferably from 40° to 70°.

The angle formed between the principal axis of refractive index anisotropy of the optically anisotropic inorganic material of the first birefringent layer and the surface of the transparent substrate, and the angle formed between the principal axis of refractive index anisotropy of the optically anisotropic inorganic material of the second birefringent layer and the surface of the transparent substrate are not particularly limited and may be appropriately selected according to the purpose. However, it is preferable that they be approximately the same angle. When it is said that they are approximately the same angle here, it means that they are different by within ±5°.

The second birefringent layer contacts the first birefringent layer such that an angle formed between a first line segment representing the principal axis of refractive index anisotropy of the first birefringent layer and a second line segment representing the principal axis of refractive index anisotropy of the second birefringent layer (this angle may hereinafter be referred to as "Nx1'−Nx2' angle") is neither 0° nor 180° when the first line segment and the second line segment are projected on the transparent substrate such that an end A of the first line segment at a side of the transparent substrate and an end B of the second line segment at a side of the transparent substrate coincide with each other.

The angle formed between the first line segment and the second line segment that are projected on the transparent substrate is preferably 90° or smaller but greater than 0°, more preferably from greater than 0° but smaller than 90°, and more preferably 70° or greater but smaller than 90°.

Here, "a principal axis of refractive index anisotropy" means a direction in which the birefringent layer has the highest refractive index.

When the end A and the end B are made to coincide, the first line segment and the second line segment projected on the transparent substrate should be prevented from being rotated relative to the projection surface.

The angle formed between the first line segment and the second line segment typically can be either of two angles that total 360°. However, it means the smaller angle (minor angle), here.

When a common explanation is to be made on the first birefringent layer and the second birefringent layer, the first birefringent layer and the second birefringent layer may be referred to as birefringent layer without distinction.

The second birefringent layer has an average thickness approximately equal to the average thickness of the first birefringent layer. When it is said here that the average thicknesses are approximately equal, it means that the difference between the average thickness of the first birefringent layer and the average thickness of the second birefringent layer is equal to or less than ⅕ of the sum total of the average thickness of the first birefringent layer and the average thickness of the second birefringent layer.

The average thickness of the first birefringent layer is not particularly limited and may be appropriately selected according to the purpose. However, it is preferably from 40 nm to 400 nm.

The average thickness of the second birefringent layer is not particularly limited and may be appropriately selected according to the purpose. However, it is preferably from 40 nm to 400 nm.

The average thickness of the birefringent layer can be measured by, for example, observation of a cross-section of the birefringent layer with a scanning electron microscope (SEM). The average thickness can be obtained by measuring the thickness at 10 positions, and arithmetically averaging the measurements.

The optically anisotropic inorganic material of the first birefringent layer is not particularly limited, and an appropriate material may be selected according to the purpose. However, it is preferably an oxide containing Si, Nb, Zr, Ti, La, Ta, or Al, or any combination thereof.

The optically anisotropic inorganic material of the second birefringent layer is not particularly limited, and an appropriate material may be selected according to the purpose. However, it is preferably an oxide containing Si, Nb, Zr, Ti, La, Ta, or Al, or any combination thereof.

It is preferable that at least any of the first birefringent layer and the second birefringent layer satisfy the following formula: $Nx>Ny>Nz$.

Nx represents a refractive index in a direction parallel with the principal axis of refractive index anisotropy. Ny represents a refractive index in a direction perpendicular to Nx. Nz represents a refractive index in a direction perpendicular to Nx and Ny.

A difference between a retardation of the first birefringent layer and a retardation of the second birefringent layer is not particularly limited, and may be appropriately selected according to the purpose. However, it is preferably 10 nm or less, and it is preferable that they be approximately equal to each other. Here, when it is said that they are approximately equal, it means that the difference between them is 3 nm or less.

It is preferable that an angle formed between a bisector of the angle formed between the first line segment and the second line segment projected on the transparent substrate and one side of the transparent substrate be approximately 45°. The range represented by approximately 45° is from 40° to 50°.

The average thickness of the first birefringent layer and the second birefringent layer is not particularly limited, and may be appropriately selected according to the purpose. However, it is preferably equal to or smaller than the wavelength used.

In the retardation element, a plurality of unit stacks each including the first birefringent layer and the second birefringent layer may be repeatedly stacked.

The first birefringent layer and the second birefringent layer can be formed by, for example, oblique deposition.

For example, in oblique deposition, particles of a high refractive index material are incident to the transparent substrate from an oblique direction. Examples of the high refractive index material include oxides such as $Ta_2O_5$, $TiO_2$, $SiO_2$, $Al_2O_3$, $CeO_2$, $ZrO_2$, $ZrO$, and $Nb_2O_5$, or a combination of these. A material mainly composed of $Ta_2O_5$ is preferable, and a material in which $TiO_2$ is added in an amount of from 5% by mass to 15% by mass in $Ta_2O_5$ is preferable.

After the oblique deposition, it is preferable to perform an annealing treatment in order to strip colors and vaporize moisture adsorbed between columnar structures. When moisture is adsorbed between columnar structures, the refractive index of the deposited film may change to alter the characteristics greatly. Therefore, the temperature for the annealing treatment is preferably 100° C. or higher at which moisture can vaporize. Further, when the temperature is too high, the columnar structures may grow to form a column-like shape together, which may degrade the birefringence, the transmissivity, etc. Therefore, the temperature is preferably 300° C. or lower.

Due to a self-shadowing effect, a layer formed by oblique deposition has a relatively high density in a direction (referred to as direction x) that is in the plane of the substrate and perpendicular to a direction of incidence of deposited particles, and has a relatively low density in a direction (referred to as direction y) that is in the plane of the substrate and parallel with the direction of incidence of the deposited particles. When light is incident to this deposited film from a direction perpendicular to the substrate, the density difference of the film appears as a refractive index difference to thereby produce birefringence. A refractive index Nx in the direction x and a refractive index Ny in the direction y have the following relationship.

$Nx>Ny$

In this case, an in-plane retardation R0 that is produced in the in-plane direction of the substrate is represented by the formula below.

$R0=(Nx-Ny) \times t$

Here, Nx−Ny is typically referred to as birefringence Δn. The birefringence Δn is determined by the refractive index of the deposited substance, deposition conditions, etc.

The in-plane retardation R0 is a product of the birefringence Δn and the thickness t of the deposited film. Therefore, when the deposited film has a relatively large birefringence Δn, it is possible to control the retardation by means of the film thickness. Typically, an in-plane retardation R0 required in a retardation element is from about 1 nm to 30 nm. The specific value of the retardation is determined by, for example, the pretilt angle of liquid crystal. In the present invention, it is possible to set the in-plane retardation R0 in a range of 0 nm<R0<1,000 nm. Therefore, the retardation element can be employed also as a quarter wavelength plate and a half wavelength plate.

A retardation Rth in the direction of film thickness of the birefringent layer is represented by the formula below.

$Rth=[Nz-(Nx+Ny)/2] \times d$

Nz represents a refractive index in a direction of film thickness of the birefringent layer.

In JP-A Nos. 2005-172984 and 2007-101764, the retardation Rth is set to a predetermined value in a retardation compensation element, in order to compensate for polarization disturbance of oblique incident light. However, in oblique deposition, it is difficult to control Nx, Ny, and Nz independently. When deposition conditions are changed, Nx and Ny change simultaneously by different amounts of change, to thereby change the birefringence Δn. Hence, it is difficult to control Nx, Ny, and Nz independently. Particularly, Nz is affected by an oblique particle shape and voids between particles, which makes it more difficult to control Nx, Ny, and Nz.

The retardation element compensates for polarization disturbance due to, for example, the pretilt angle of an optical modulator, by utilizing, for example, an in-plane birefringence attributed to the first birefringent layer and the second birefringent layer formed by oblique deposition.

Other Members

Examples of the other member include a stress adjusting layer, and an antireflection layer.

Stress Adjusting Layer

The stress adjusting layer is not particularly limited, and an appropriate layer may be selected according to the purpose, as long as it is deposited for preventing warpage of the retardation element and configured to adjust stress. Examples of the Material thereof include $SiO_2$.

The layer configuration of the retardation element is not particularly limited and may be appropriately selected according to the purpose. Examples of the layer configuration include the followings.

(1) retardation imparting antireflection layer/transparent substrate/first birefringent layer/second birefringent layer
(2) transparent substrate/first birefringent layer/second birefringent layer/retardation imparting antireflection layer
(3) transparent substrate/retardation imparting antireflection layer/first birefringent layer/second birefringent layer The stress adjusting layer may be provided between the transparent substrate and the retardation imparting antireflection layer, between the transparent substrate and the first birefringent layer, and between the retardation imparting antireflection layer and the first birefringent layer.

Liquid Crystal Display Device and Production Method Thereof

A liquid crystal display device of the present invention includes at least a liquid crystal panel, a first polarizer, a second polarizer, and the retardation element of the present invention, and further includes other members according to necessity.

A method for producing a liquid crystal display device of the present invention is a method for producing the liquid crystal display device of the present invention, and includes at least a disposing step, and further includes other steps according to necessity.

The disposing step is a step of disposing a retardation element on an optical path between a liquid crystal panel and a second polarizer such that one side of a substrate of the liquid crystal panel and one side of the retardation element approximately coincide with each other.

Liquid Crystal Panel

The liquid crystal panel is not particularly limited, and an appropriate liquid crystal panel may be selected according to the purpose as long as it include a substrate and a VA mode liquid crystal layer containing liquid crystal molecules having a pretilt from a direction perpendicular to a principal surface of the substrate, and is configured to modulate an incident flux of light.

The VA mode (vertical alignment mode) means a mode of moving liquid crystal molecules aligned perpendicularly to the substrate (or aligned to have a pretilt), by using a longitudinal electric field in the perpendicular direction.

Examples of the substrate include a glass substrate.

First Polarizer and Second Polarizer

The first polarizer is not particularly limited, and an appropriate polarizer may be selected according to the purpose as long as it is a polarizer disposed on an incident side of the liquid crystal panel.

The second polarizer is not particularly limited, and an appropriate polarizer may be selected according to the purpose as long as it is a polarizer disposed on an emission side of the liquid crystal panel.

It is preferable that the first polarizer and the second polarizer be an inorganic polarizer in terms of durability. Examples of the inorganic polarizer include a polarizer obtained by depositing inorganic particles (a semiconductor or a metal) having a size shorter than the wavelength range used and having a shape anisotropy over a substrate (a glass substrate) transparent of light in the wavelength range used, by a vacuum deposition method such as sputtering and vacuum vapor deposition.

Retardation Element

The retardation element is the retardation element of the present invention, and is disposed between the liquid crystal panel and the second polarizer.

It is preferable that an imaginary line projected on the transparent substrate and representing a direction in which the liquid crystal molecules are inclined from the direction perpendicular to a surface of the substrate by the pretilt and a bisector of the angle formed between the first line segment and the second line segment projected on the transparent substrate be approximately parallel with each other. This enables for a retardation produced by the pretilt to be appropriately compensated for. Here, when it is said that they are approximately parallel with each other, it means that an angle formed between them is within ±5°.

It is preferable that the liquid crystal display device include between the liquid crystal panel and the first polarizer, a third polarizer that is transmissive of light having a same direction of polarization as that of light transmissive through the first polarizer.

It is preferable that the retardation element and the liquid crystal panel be stuck with each other with a highly heat-resistant adhesive.

It is preferable that the retardation element and the second polarizer be stuck with each other with a highly heat-resistant adhesive.

In the liquid crystal display device, it is preferable that an end of the retardation element be fixed on a holder of which in-plane angle is adjustable, with an adhesive or a double-face tape.

Projection Display Device

A projection display device of the present invention includes at least a light source, a projection optical system, and the liquid crystal display device of the present invention, and further includes other members according to necessity.

Light Source

The light source is not particularly limited, and an appropriate light source may be selected according to the purpose as long as it is a member that emits light. Examples thereof include an extra high pressure mercury lamp that emits white light.

Projection Optical System

The projection optical system is not particularly limited, and an appropriate projection optical system may be selected according to the purpose, as long as it is a member that projects modulated light. Examples thereof include a projection lens that projects modulated light onto a screen.

Liquid Crystal Display Device

The liquid crystal display device is disposed on an optical path between the light source and the projection optical system.

Figure 10:
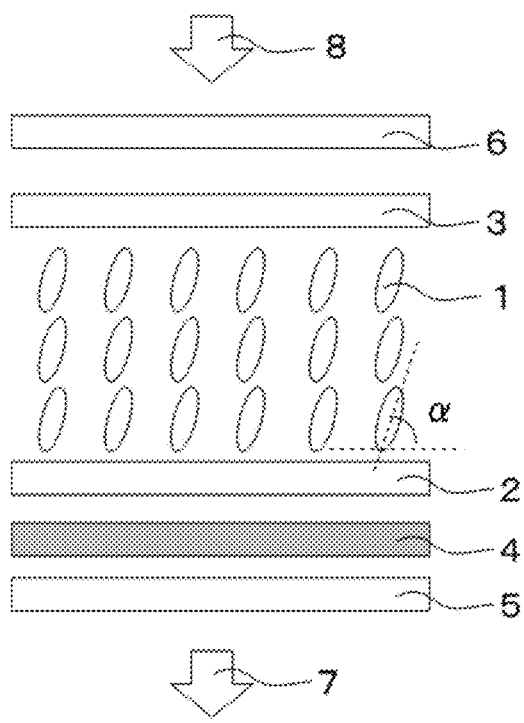
FIG. 10 is a schematic diagram showing an example of a configuration of a liquid crystal display device.

A representative optical system will be explained with reference to FIG. 10. In a vertical alignment mode transmissive liquid crystal panel, when no voltage is applied, liquid crystal molecules 1 are aligned as inclined to a certain direction from a direction perpendicular to a surface of a substrate by a pretilt angle α. In this case, the liquid crystal panel is disposed as sandwiched between a pair of polarizers faced with each other such that the directions of their transmission axes cross at 90°. In FIG. 10, the sign 2 denotes a glass substrate, the sign 3 denotes a glass substrate, the sign 4 denotes a retardation element, the sign 5 denotes a second polarizer, the sign 6 denotes a first polarizer, the sign 7 denotes emitted light, and the sign 8 denotes incident light.

Figure 11:
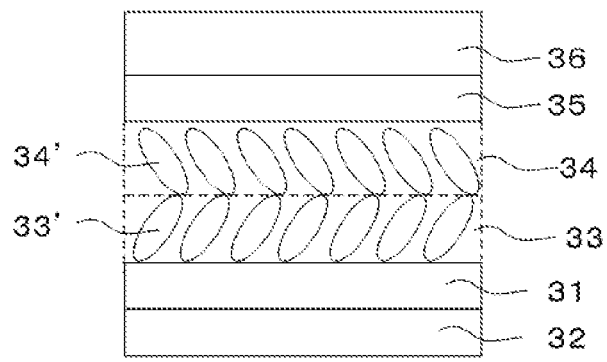
FIG. 11 is a schematic diagram showing an example of a structure of a retardation element according to the present invention.

FIG. 11 is a schematic diagram showing an example of a configuration of the retardation element of the present invention. In FIG. 11, the sign 31 denotes a transparent substrate, the sign 32 denotes a retardation imparting anti-reflection layer, the sign 33 denotes a first birefringent layer, the sign 34 denotes a second birefringent layer, the sign 35 denotes a protection layer, and the sign 36 denotes a retardation imparting antireflection layer. The sign 33' denotes a biaxial index ellipsoid. The sign 34' denotes a biaxial index ellipsoid. Examples of the material of the protection layer include $SiO_2$.

Figure 12:
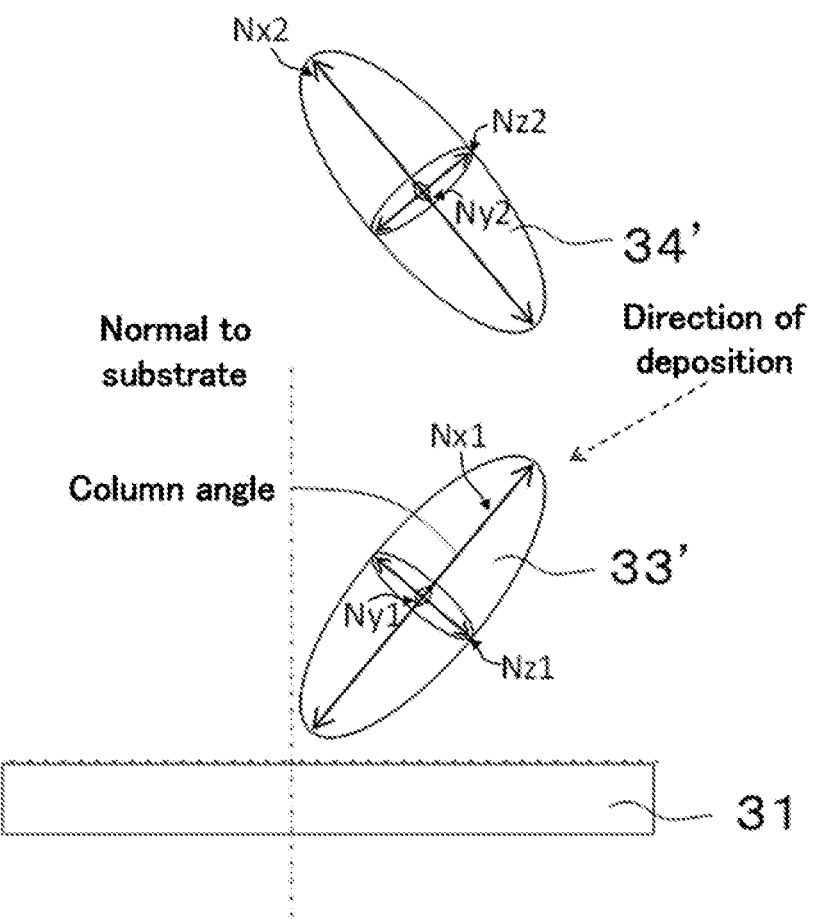
FIG. 12 is a schematic diagram of index ellipsoids that can be approximated by a birefringent layer formed by oblique deposition.

FIG. 12 is a schematic diagram of index ellipsoids that can be approximated by birefringent layers formed by oblique deposition. Generally, the direction in which the largest refractive index is obtained is a direction parallel with the direction of deposition (this refractive index will hereinafter be referred to as Nx). There is typically a relationship of Nx>Ny>Nz among Nx, Ny which is a refractive index in a direction perpendicular to the direction of deposition, and Nz is a refractive index in a direction perpendicular to both of Nx and Ny.

Figure 13A:
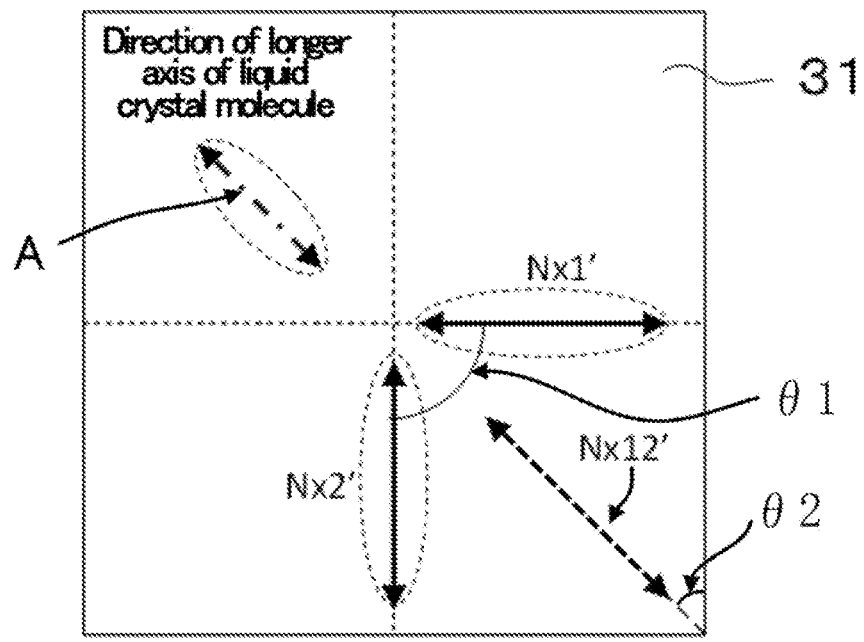
FIG. 13A is a plan view of an example showing positions of respective axes when a retardation element of the present invention is projected on a transparent substrate from a direction normal to the substrate (a direction perpendicular to a surface of the transparent substrate).

FIG. 13A is a plan view showing the projected positions of various axes of the retardation element of the present invention, when it is projected on the transparent substrate from a direction normal to the substrate (a direction perpendicular to the surface of the transparent substrate). It is preferable that the first birefringent layer and the second birefringent layer be deposited such that an angle (Nx1'–Nx2' angle) between a projected axis Nx1' of the axis of Nx of the first birefringent layer (this axis is referred to as Nx1) and a projected axis Nx2' of the axis of Nx of the second birefringent layer (this axis is referred to as Nx2) is from 70° or greater but smaller than 90°. The substrate may be rotated during the deposition, or the substrate may be fixed for the layers to be deposited from two deposition sources in the different directions.

It is preferable to dispose the retardation element such that an axis Nx12' drawn in exactly the center of the Nx1'–Nx2' angle (the axis Nx12' being the bisector of the angle formed between the two line segments projected on the transparent substrate 21) roughly coincides directionally with an axis projected on the substrate and representing the direction of the longer axis of the liquid crystal molecules of the transmissive liquid crystal panel that are inclined by the pretilt angle.

Figure 13B:
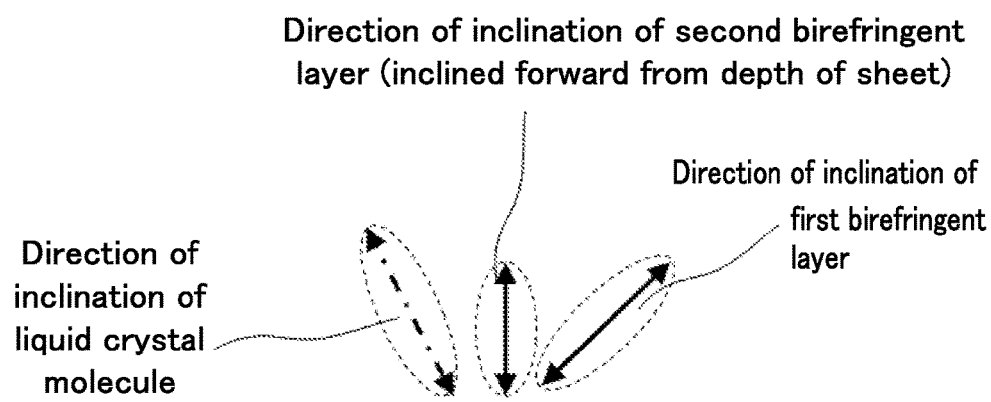
FIG. 13B is a schematic diagram of an example showing directions of inclination of a liquid crystal molecule, a first birefringent layer, and a second birefringent layer, when it is assumed that they are placed on the same plane.

FIG. 13B is a diagram showing the directions of inclination of a liquid crystal molecule, the first birefringent layer, and the second birefringent layer when they are disposed on the same plane. As shown in FIG. 13B, it is preferable that they be disposed such that the direction in which the liquid crystal molecule is inclined is at an angle of 90° or greater from each of the directions Nx1 and Nx2.

With this configuration, the first birefringent layer corrects a characteristic change (at least one of a change of the progressive direction of light, a change of a polarized state, and a basic characteristic parameter of light such as a frequency) of light that has transmitted through the liquid crystal panel, and the second birefringent layer further corrects a characteristic change of the light. This makes it possible to correct characteristic changes of the light due to the pretilt angle of the liquid crystal molecules effectively and highly precisely.

Meanwhile, the pretilt angle of the liquid crystal molecules varies depending on the characteristics of the liquid crystal panel. Therefore, the retardation value required for compensating for the pretilt angle varies depending on the panel.

For example, International Publication No. WO2008/081919 describes that it is possible to obtain a high contrast and a compensation effect having little unevenness, with two or more facing compensation layers that have different film thicknesses to have retardation values different by 10 nm, and are angularly adjusted in the in-plane direction.

Here, when, for example, a material mainly composed of $Ta_2O_5$ is obliquely deposited from a direction inclined from the direction normal to the substrate by 70°, the deposited retardation layer has a birefringence Δn of about 0.075 (for example, see "Thin film retardation plate by oblique deposition" APPLIED OPTICS/Vol. 28, No. 13/1 Jul. 1989). In this case, a retardation Re0 produced in normal incident light (referred to as normal retardation) is represented as Re0=Δn×t (where t is the film thickness of the retardation layer). Therefore, in order for two or more compensation layers to have retardations different by 10 nm, it is necessary that the film thicknesses of the layers be different by 10/0.075=133 nm. When it is assumed that one compensation layer has a thickness of 100 nm, the total compensation layer thickness required is 100+(100+133)=333 nm.

Figure 14:
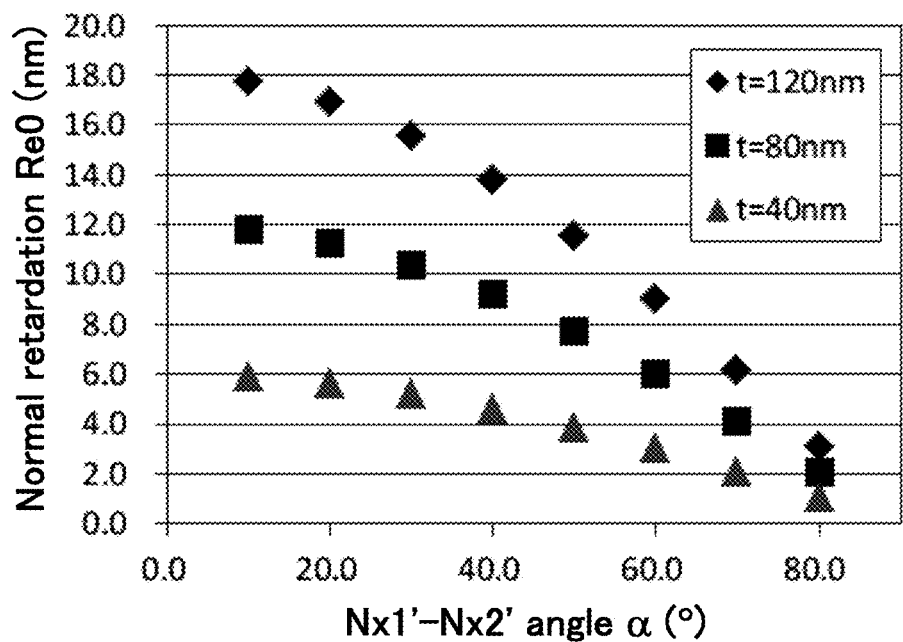
FIG. 14 is a graph showing a relationship between a normal retardation and a $Nx1'-Nx2'$ angle α, when an average thickness t per each birefringent layer is varied.

According to the present invention, it is possible to control the retardation by means of mainly the Nx1'–Nx2' angle α. FIG. 14 shows a relationship between a normal retardation and the Nx1'–Nx2' angle α when the average thickness t of each birefringent layer is changed. Generally, a retardation produced by the pretilt angle of a liquid crystal panel is several nanometers. For example, when the retardation that needs to be compensated for is 2 nm, it is possible to select approximately t=40 nm and α=70°, or t=80 nm and α=80°, as the design of the retardation element. In this case, the total thickness of the birefringent layers is approximately 80 nm or 160 nm. Therefore, thinning can be realized. Further, production variations can be suppressed when the film thicknesses of the respective layers are equal.

Meanwhile, when it is necessary to compensate for only the pretilt angle, it is possible to select an arbitrary film thickness and adjust α. However, in a liquid crystal panel, a retardation occurs also in oblique incident light as described above. In order to perform optical compensation for this retardation of oblique incident light together, it is necessary to adjust the film thickness of the birefringent layers to one that is suitable for the compensation.

Figure 15A:
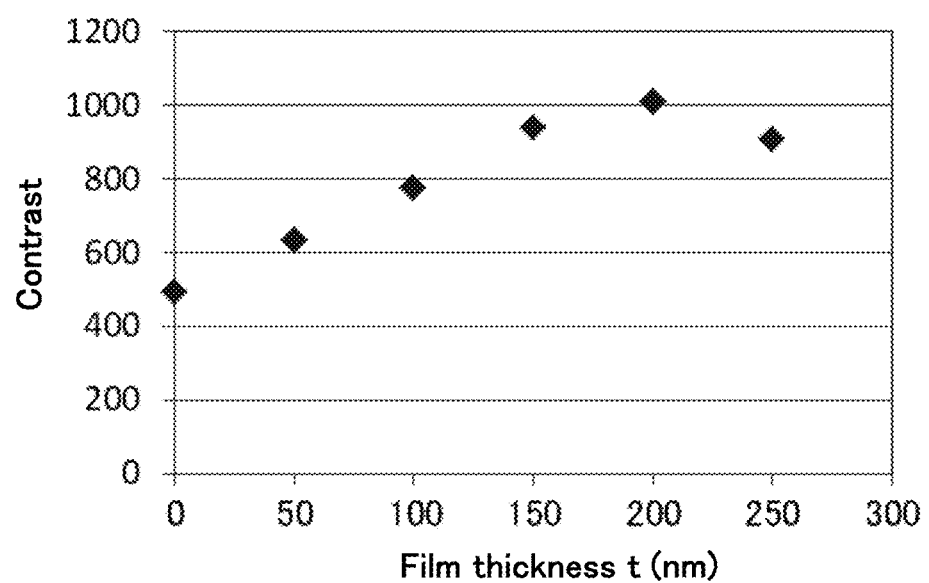
FIG. 15A is a graph showing dependency of contrast of a projected image on a film thickness when a pretilt angle α of a liquid crystal panel is 85°.
Figure 15B:
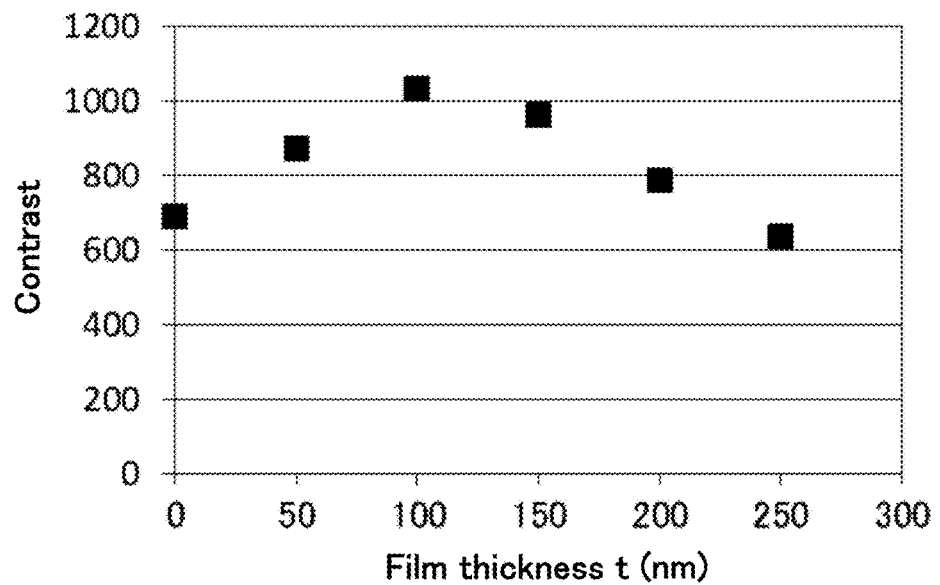
FIG. 15B is a graph showing dependency of contrast of a projected image on a film thickness when a pretilt angle a of a liquid crystal panel is 87°.

FIG. 15A and FIG. 15B show dependency of contrast of a projected image on a film thickness when the pretilt angle α of a liquid crystal panel is 85° (FIG. 15A) and 87° (FIG. 15B), respectively. The result shown at the film thickness t=0 is a result of measuring a liquid crystal display device in which no retardation element is provided.

The configuration diagram of an optical system sued for evaluation is as shown in FIG. 10. The order of deposition is a first polarizer, a liquid crystal panel, a retardation element, and a second polarizer. The luminance of an image projected when light is incident from the outside of the first polarizer is measured. Two kinds of luminance, namely, one in a light transmitted state (in a state that the liquid crystal molecules are aligned horizontally), and one in a light shielded state (in a state that the liquid crystal molecules are aligned vertically) are measured, and a contrast is calculated by calculating the ratio between them.

With the configuration of the present invention, a contrast is improved as compared with when, for example, no retardation element is used. Further, it can be understood that an optimum film thickness greatly varies depending on the pretilt angle. This means that a retardation produced in oblique incident light that passes through a liquid crystal panel varies depending not only on the thickness of the liquid crystal layer but also on the pretilt angle of the liquid crystal molecules. In order to compensate for the pretilt angle and a retardation produced in oblique incident light at the same time and optimally, it is good to optimize a film thickness and determine such a Nx1'−Nx2' angle as would compensate for a normal retardation. The present invention has a configuration optimal for this purpose.

However, when birefringent layers are formed by oblique deposition with which it is difficult to adjust the refractive indices of the respective axes, optical compensation may be insufficient by means of only the optimization of a film thickness. The liquid crystal display device of the present invention can also solve this problem by including the retardation element that serves also as a retardation imparting antireflection layer.

Next, an example of a projection display device will be explained.

Figure 16:
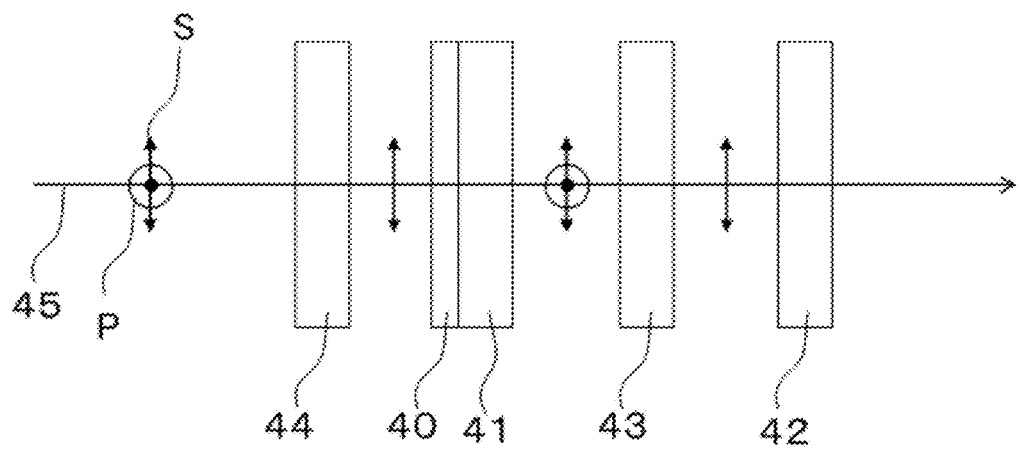
FIG. 16 is a schematic diagram showing an example of a projection display device.

FIG. 16 is a schematic cross-sectional diagram showing a configuration of a portion of an optical engine used in the projection display device. The projection display device is a transmissive liquid crystal projector that includes a transmissive polarizer 44, a vertically aligned liquid crystal layer 40, a transmissive optical modulator 41, a retardation element 43, and a transmissive polarizer 42. Here, the retardation element 43 includes a transparent substrate, a first birefringent layer, a second birefringent layer, and a retardation imparting antireflection layer. The retardation imparting antireflection layer imparts a retardation different from an oblique incident light retardation produced in the birefringent layers, and controls the value of the retardation. According to this, the birefringent layers can compensate for polarization disturbance due to the pretilt angle of the transmissive optical modulator 41, the retardation imparting antireflection layer can compensate for polarization disturbance due to oblique incident light incident to the transmissive optical modulator 41, and the retardation imparting antireflection layer can prevent reflection. This makes it possible to obtain a high contrast. In FIG. 16, the sign 45 denotes incident light, the sign P denotes P-polarized light, and the sign S denotes S-polarized light.

In this liquid crystal projector, light emitted from the light source is converted to plane-polarized light, then split into color light rays of R (red), G (green), and B (blue), and incident to the transmissive polarizer 44 provided for each color.

Linearly-polarized light (S-polarized light component) that transmits through the transmissive polarizer 44 is incident to the vertically aligned liquid crystal layer 40, which emits from each pixel, transmitted light modulated in the pixel. The emitted light transmits through the retardation element 43, and then transmits through or is reflected and absorbed by the transmissive polarizer 42. Light that has transmitted through the transmissive polarizer 42 is recombined through a prism into RGB light, and an image is displayed on the projection screen.

For example, in a setting for black display, S-polarized light that transmits through the transmissive polarizer 44 transmits through the vertically aligned liquid crystal layer 40 as maintained as S-polarized light. However, an undesired polarized light component (P-polarized light component) also transmits because of the polarization disturbance during the transmission as described above. When there is no retardation element 43, the P-polarized light component transmits through the transmissive polarizer 42 and is displayed on the screen as light, which is a factor of degrading the black display. With the retardation element of the present invention, it is possible to improve black display, and as a result, improve the contrast of a projected image, by compensating for the polarization disturbance and reduce as much of the P-polarized light component as possible.

EXAMPLES

Examples of the present invention will now be explained below. The present invention is not limited to these Examples by any means.

Example 1

Production of Retardation Element

A retardation imparting antireflection layer was formed over one side of a glass substrate (with an average thickness of 0.7 mm) by stacking thirty-four layers of from No. 1 to No. 34 shown in Table 1 below alternately with $Nb_2O_5$ and $SiO_2$ by sputtering. In this case, the layers were configured such that a retardation of 7.0 nm would be imparted to oblique incident light inclined from the direction perpendicular to a surface of the glass substrate by 15°.

TABLE 1

| No. | Material of thin film | Film thickness (nm) |
| --- | --- | --- |
| 1 | $Nb_2O_5$ | 15.00 |
| 2 | $SiO_2$ | 53.74 |
| 3 | $Nb_2O_5$ | 40.35 |
| 4 | $SiO_2$ | 47.52 |
| 5 | $Nb_2O_5$ | 32.40 |
| 6 | $SiO_2$ | 55.07 |
| 7 | $Nb_2O_5$ | 33.54 |
| 8 | $SiO_2$ | 46.60 |
| 9 | $Nb_2O_5$ | 31.81 |
| 10 | $SiO_2$ | 53.47 |
| 11 | $Nb_2O_5$ | 33.19 |
| 12 | $SiO_2$ | 48.61 |
| 13 | $Nb_2O_5$ | 32.75 |
| 14 | $SiO_2$ | 54.15 |
| 15 | $Nb_2O_5$ | 32.44 |
| 16 | $SiO_2$ | 49.60 |
| 17 | $Nb_2O_5$ | 32.35 |
| 18 | $SiO_2$ | 53.73 |
| 19 | $Nb_2O_5$ | 32.25 |
| 20 | $SiO_2$ | 49.42 |
| 21 | $Nb_2O_5$ | 31.44 |
| 22 | $SiO_2$ | 54.95 |
| 23 | $Nb_2O_5$ | 31.20 |
| 24 | $SiO_2$ | 50.90 |
| 25 | $Nb_2O_5$ | 33.69 |
| 26 | $SiO_2$ | 57.50 |

TABLE 1-continued

| No. | Material of thin film | Film thickness (nm) |
|---|---|---|
| 27 | $Nb_2O_5$ | 31.19 |
| 28 | $SiO_2$ | 42.50 |
| 29 | $Nb_2O_5$ | 29.82 |
| 30 | $SiO_2$ | 52.02 |
| 31 | $Nb_2O_5$ | 30.38 |
| 32 | $SiO_2$ | 43.56 |
| 33 | $Nb_2O_5$ | 46.47 |
| 34 | $SiO_2$ | 104.48 |

Next, a deposition material in which $TiO_2$ was added in $Ta_2O_5$ was obliquely deposited over the other side of the glass substrate in a state that the deposition source was placed at an angle of 70° from the direction perpendicular to the surface of the glass substrate, to thereby form a first birefringent layer.

Next, the glass substrate was rotated by 84° in the in-plane direction, and oblique deposition was performed, to thereby form a second birefringent layer over the formed first birefringent layer.

After the deposition, an annealing treatment was performed at 200° C. for 5 hours in order to strip colors and vaporize moisture adsorbed between columnar structures.

Samples in which the average thicknesses of the first birefringent layer and the second birefringent layer were varied respectively in the range of from 40 nm to 400 nm were prepared.

Next, an antireflection layer (having an average thickness of 400 nm) formed of a $SiO_2/Nb_2O_5$ multilayer film was formed by sputtering over the second birefringent layer in order to improve the transmissivity.

Production of Liquid Crystal Display Device

The retardation element produced in this way, a first polarizer (MAIN POLARIZER manufactured by Dexerials Corporation), a second polarizer (MAIN POLARIZER manufactured by Dexerials Corporation), and a vertically aligned liquid crystal panel (a liquid crystal panel in which a vertically aligned liquid crystal material having a positive refractive index anisotropy and a negative dielectric constant anisotropy was injected, that had a liquid crystal layer in which Δn×d was 332 nm, where Δn was a specific refractive index and d was a liquid crystal layer thickness, and of which pretilt angle engineered by means of an aligned film formed by oblique deposition was)85° were arranged as shown in FIG. 10, to thereby produce a liquid crystal display device. Then, a contrast of a projected image was measured.

Figure 17:
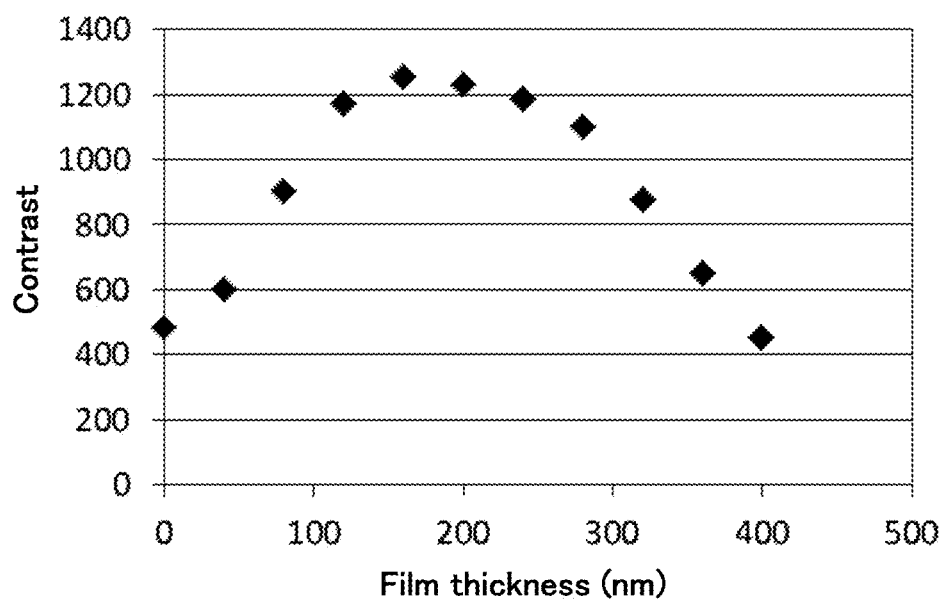
FIG. 17 is a graph showing a relationship between a film thickness of a first birefringent layer and a second birefringent layer, and contrast.

FIG. 17 is a diagram showing a relationship between the average thicknesses (film thicknesses) of the first birefringent layer and the second birefringent layer of the retardation element, and a contrast. The film thicknesses of the two layers were approximately equal. The plotting at a film thickness of 0 represents a contrast obtained when there was no retardation element.

The optical system configuration of the present invention obtained about twice as great a contrast as when there was no retardation element, by including the first birefringent layer and the second birefringent layer of which film thicknesses were from 80 nm to 320 nm. Furthermore, the obtained contrast was about three times as great when the film thicknesses of the first birefringent layer and the second birefringent layer were from 120 nm to 240 nm, respectively.

Figure 18:
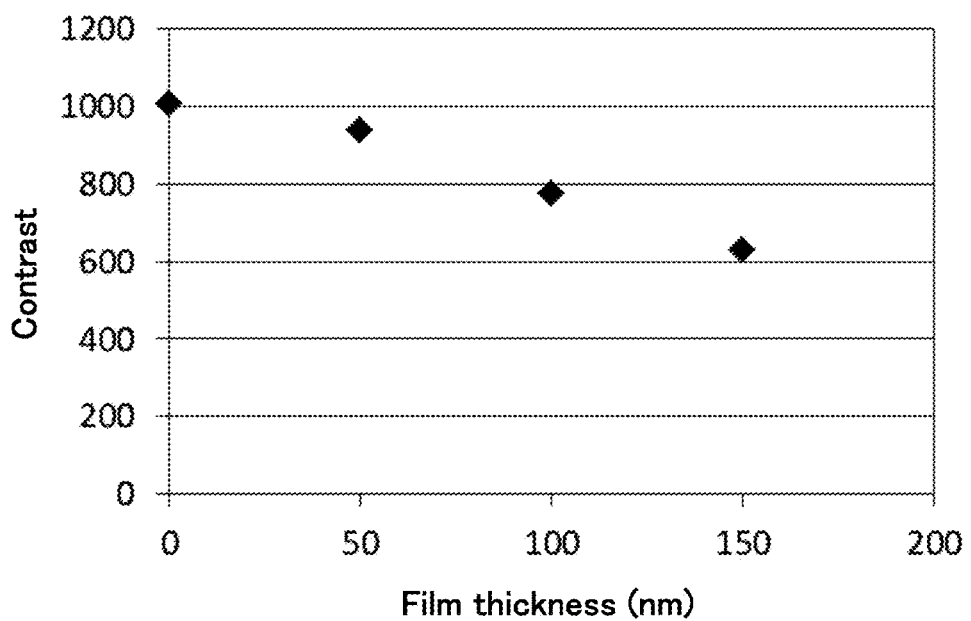
FIG. 18 is a graph showing a relationship between a difference of film thicknesses of a first birefringent layer and a second birefringent layer, and contrast.

FIG. 18 shows a relationship between the film thickness difference between the first birefringent layer and the second birefringent layer of the retardation element, and a contrast of a projected image. The larger the film thickness difference, the poorer the contrast. Therefore, it is preferable that the film thickness difference between the birefringent layers be 50 nm or less.

Example 2

Production of Retardation Element

A retardation imparting antireflection layer was formed over one side of a glass substrate (with an average thickness of 0.7 mm) by stacking thirty-four layers of from No. 1 to No. 34 shown in Table 1 above alternately with $Nb_2O_5$ and $SiO_2$ by sputtering. In this case, the layers were configured such that a retardation of 7.0 nm would be imparted to oblique incident light inclined from the direction perpendicular to a surface of the glass substrate by 15°.

Next, a deposition material in which $TiO_2$ was added in $Ta_2O_5$ was obliquely deposited over the other side of the glass substrate in a state that the deposition source was placed at an angle of 70° from the direction perpendicular to the surface of the glass substrate, to thereby form a first birefringent layer.

Next, a second birefringent layer was formed over the first birefringent layer successively. The average thickness (film thickness) of the first birefringent layer and the second birefringent layer was about 160 nm. Several samples in which the Nx1'–Nx2' angle shown in FIG. 13A was varied in the range of from 60° to 98° were produced.

After the deposition, an annealing treatment was performed at 200° C. for 5 hours in order to strip colors and vaporize moisture adsorbed between columnar structures.

Next, an antireflection layer was formed over the birefringent layer in order to improve the transmissivity.

Production of Liquid Crystal Display Device

The retardation element produced in this way, a first polarizer (MAIN POLARIZER manufactured by Dexerials Corporation), a second polarizer (MAIN POLARIZER manufactured by Dexerials Corporation), and a vertically aligned liquid crystal panel (a liquid crystal panel in which a vertically aligned liquid crystal material having a positive refractive index anisotropy and a negative dielectric constant anisotropy was injected, that had a liquid crystal layer in which Δn×d was 332 nm, where Δn was a specific refractive index and d was a liquid crystal layer thickness, and of which pretilt angle engineered by means of an aligned film formed by oblique deposition was)85° were arranged as shown in FIG. 10, to thereby produce a liquid crystal display device. Then, a contrast of a projected image was measured.

Figure 19:
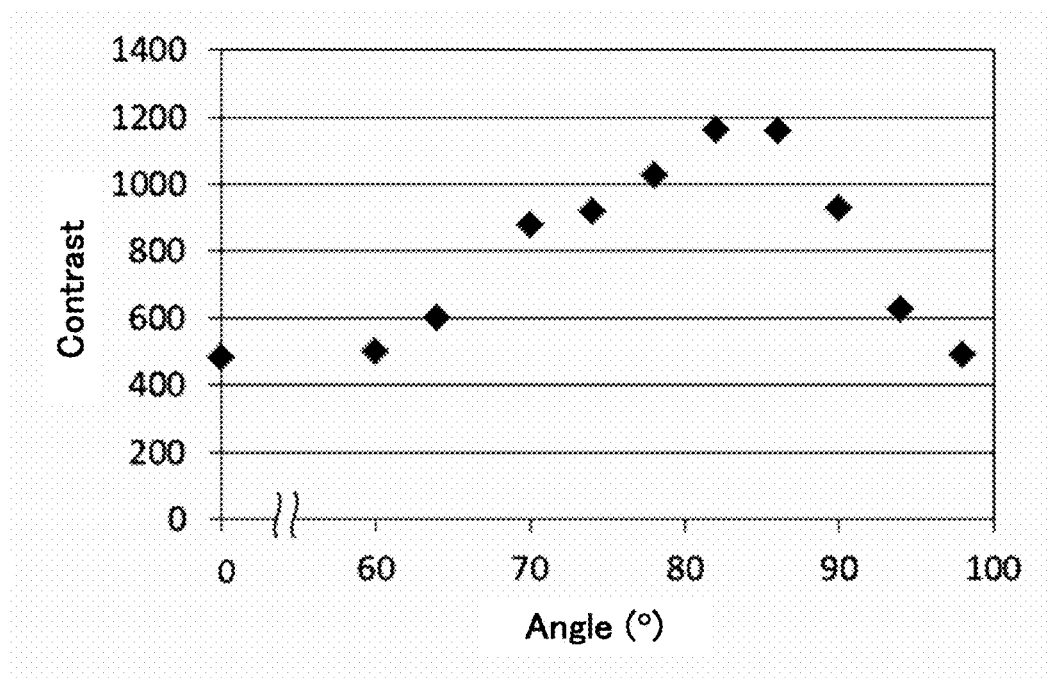
FIG. 19 is a graph showing a relationship between a $Nx1'-Nx2'$ angle and contrast.

FIG. 19 is a diagram showing a relationship between the Nx1'–Nx2' angle and a contrast of a projected image. The plotting at an angle of 0° represents a contrast obtained when there was no retardation element. The optical system configuration of the present invention obtained a much greater contrast than when there was no retardation element. Furthermore, the obtained contrast was about twice as great when the angle was from 70° to 90°.

Example 3

Production of Retardation Element

In the same manner as in Example 1, retardation elements in which the film thicknesses of the first birefringent layer and the second birefringent layers were varied in the range of from 40 nm to 400 nm were produced. The Nx1'–Nx2' angle was 82°.

Production of Liquid Crystal Display Device

Each retardation element obtained in this way, a first polarizer (MAIN POLARIZER manufactured by Dexerials Corporation), a second polarizer (MAIN POLARIZER manufactured by Dexerials Corporation), and a vertically aligned liquid crystal panel (a liquid crystal panel in which a vertically aligned liquid crystal material having a positive refractive index anisotropy and a negative dielectric constant anisotropy was injected, that had a liquid crystal layer in which Δn×d was 332 nm, where Δn was a specific refractive index and d was a liquid crystal layer thickness, and of which pretilt angle engineered by means of an aligned film formed by oblique deposition was 87°) were arranged as shown in FIG. 10, to thereby produce a liquid crystal display device. Then, a contrast of a projected image was measured.

Figure 20:
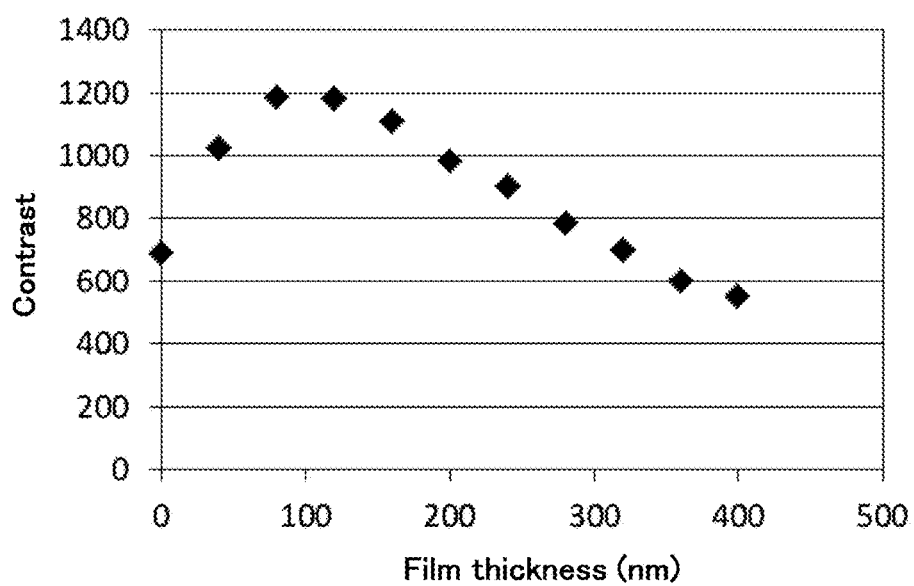
FIG. 20 is a graph showing a relationship between a film thickness of a first birefringent layer and a second birefringent layer, and contrast.

FIG. 20 is a diagram showing a relationship between the average thicknesses (film thicknesses) of the first birefringent layer and the second birefringent layer of the retardation element, and a contrast. The film thicknesses of the two layers were approximately equal. The plotting at the film thickness of 0 represents a contrast obtained when no retardation element was inserted. The optical system configuration of the present invention obtained 1.5 or greater times as great a contrast as when there was no retardation element, by having a film thickness of from 40 nm to 200 nm. Further, the contrast was about twice as great when the film thickness was from 80 nm to 120 nm.

Example 4

Production of Retardation Element

In the same manner as in Example 2, several retardation elements in which the Nx1'–Nx2' angle was varied in the range of from 60° to 98° were produced. The average thickness (film thickness) of the first birefringent layer and the second birefringent layer was about 80 nm.

Production of Liquid Crystal Display Device

Each retardation element obtained in this way, a first polarizer (MAIN POLARIZER manufactured by Dexerials Corporation), a second polarizer (MAIN POLARIZER manufactured by Dexerials Corporation), and a vertically aligned liquid crystal panel (a liquid crystal panel in which a vertically aligned liquid crystal material having a positive refractive index anisotropy and a negative dielectric constant anisotropy was injected, that had a liquid crystal layer in which Δn×d was 332 nm, where Δn was a specific refractive index and d was a liquid crystal layer thickness, and of which pretilt angle engineered by means of an aligned film formed by oblique deposition was 87°) were arranged as shown in FIG. 10, to thereby produce a liquid crystal display device. Then, a contrast of a projected image was measured.

Figure 21:
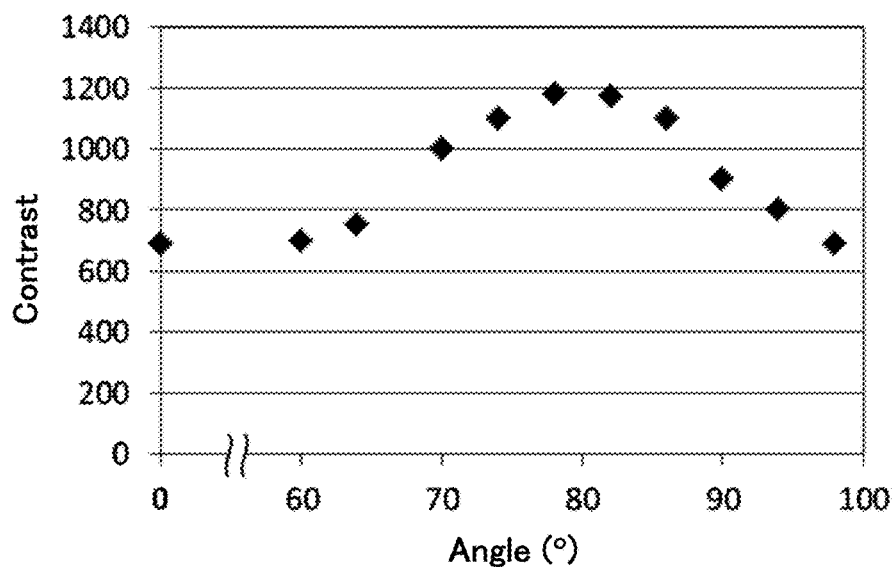
FIG. 21 is a graph showing a relationship between a $Nx1'-Nx2'$ angle and contrast.

FIG. 21 is a diagram showing a relationship between the Nx1'–Nx2' angle and a contrast of a projected image. The plotting at an angle of 0 represents a contrast obtained when there was no retardation element. It can be seen that the contrast was increased by the insertion of the retardation element of the present invention into the optical system. The optical system configuration of the present invention obtained about 1.5 or greater times as great a contrast as when there was no retardation element, by adjusting the angle in the range of from 75° to 86°. Furthermore, the obtained contrast was about twice as great when the angle was in the range of from 78° to 82°.

As shown in Examples 1 to 4, the liquid crystal display device of the present invention enable optimum optical compensation on various types of liquid crystal panels without particularly performing angle adjustment of the retardation element, etc., and thereby improve a contrast.

Next, an effect of the retardation imparting antireflection layer will be explained based on Examples.

Example 5

A retardation imparting antireflection layer was formed over one side of a glass substrate (with an average thickness of 0.7 mm) by stacking layers from No. 1 of Tables 1 to 4 in order alternately with $Nb_2O_5$ and $SiO_2$ by sputtering. Samples in which the layers were configured such that retardations of 3.5 nm, 7.0 nm, 10.5 nm, and 14.0 nm would be imparted to incident light inclined from a direction normal to the substrate by 15°, were produced respectively. The configuration of the retardation imparting antireflection layer of each of the samples is shown in Table 1 (a retardation of 7.0 nm), Table 2 (a retardation of 3.5 nm), Table 3 (a retardation of 10.5 nm), and Table 4 (a retardation of 14.0 nm).

Next, a birefringent layer was formed on the other side of the glass substrate through the same process as in Example 1. The average thickness (film thickness) was 160 nm, and the Nx1'–Nx2' angle was 84°. Through the process described above, retardation elements used for a liquid crystal display device were produced.

TABLE 2

| No. | Material of thin film | Film thickness (nm) |
| --- | --- | --- |
| 1 | $Nb_2O_5$ | 15.00 |
| 2 | $SiO_2$ | 55.97 |
| 3 | $Nb_2O_5$ | 32.46 |
| 4 | $SiO_2$ | 55.15 |
| 5 | $Nb_2O_5$ | 28.27 |
| 6 | $SiO_2$ | 51.02 |
| 7 | $Nb_2O_5$ | 31.64 |
| 8 | $SiO_2$ | 47.14 |
| 9 | $Nb_2O_5$ | 33.34 |
| 10 | $SiO_2$ | 48.28 |
| 11 | $Nb_2O_5$ | 35.39 |
| 12 | $SiO_2$ | 40.67 |
| 13 | $Nb_2O_5$ | 40.13 |
| 14 | $SiO_2$ | 28.73 |
| 15 | $Nb_2O_5$ | 68.79 |
| 16 | $SiO_2$ | 26.30 |
| 17 | $Nb_2O_5$ | 53.29 |
| 18 | $SiO_2$ | 22.82 |
| 19 | $Nb_2O_5$ | 67.07 |
| 20 | $SiO_2$ | 97.35 |

TABLE 3

| No. | Material of thin film | Film thickness (nm) |
| --- | --- | --- |
| 1 | $Nb_2O_5$ | 15.00 |
| 2 | $SiO_2$ | 50.80 |
| 3 | $Nb_2O_5$ | 39.55 |
| 4 | $SiO_2$ | 48.29 |
| 5 | $Nb_2O_5$ | 34.14 |
| 6 | $SiO_2$ | 57.53 |
| 7 | $Nb_2O_5$ | 35.71 |
| 8 | $SiO_2$ | 50.60 |
| 9 | $Nb_2O_5$ | 32.76 |
| 10 | $SiO_2$ | 53.40 |
| 11 | $Nb_2O_5$ | 34.96 |
| 12 | $SiO_2$ | 52.00 |
| 13 | $Nb_2O_5$ | 33.79 |
| 14 | $SiO_2$ | 54.06 |
| 15 | $Nb_2O_5$ | 34.98 |
| 16 | $SiO_2$ | 51.25 |
| 17 | $Nb_2O_5$ | 32.96 |
| 18 | $SiO_2$ | 53.45 |
| 19 | $Nb_2O_5$ | 35.56 |

TABLE 3-continued

| No. | Material of thin film | Film thickness (nm) |
|---|---|---|
| 20 | $SiO_2$ | 52.67 |
| 21 | $Nb_2O_5$ | 33.32 |
| 22 | $SiO_2$ | 52.80 |
| 23 | $Nb_2O_5$ | 34.83 |
| 24 | $SiO_2$ | 52.04 |
| 25 | $Nb_2O_5$ | 33.26 |
| 26 | $SiO_2$ | 53.68 |
| 27 | $Nb_2O_5$ | 35.78 |
| 28 | $SiO_2$ | 53.16 |
| 29 | $Nb_2O_5$ | 32.47 |
| 30 | $SiO_2$ | 51.87 |
| 31 | $Nb_2O_5$ | 35.49 |
| 32 | $SiO_2$ | 54.61 |
| 33 | $Nb_2O_5$ | 33.02 |
| 34 | $SiO_2$ | 53.08 |
| 35 | $Nb_2O_5$ | 35.42 |
| 36 | $SiO_2$ | 53.25 |
| 37 | $Nb_2O_5$ | 30.91 |
| 38 | $SiO_2$ | 51.30 |
| 39 | $Nb_2O_5$ | 38.78 |
| 40 | $SiO_2$ | 61.37 |
| 41 | $Nb_2O_5$ | 32.90 |
| 42 | $SiO_2$ | 45.71 |
| 43 | $Nb_2O_5$ | 50.30 |
| 44 | $SiO_2$ | 102.64 |

TABLE 4

| No. | Material of thin film | Film thickness (nm) |
|---|---|---|
| 1 | $Nb_2O_5$ | 15.00 |
| 2 | $SiO_2$ | 58.73 |
| 3 | $Nb_2O_5$ | 37.61 |
| 4 | $SiO_2$ | 56.27 |
| 5 | $Nb_2O_5$ | 37.68 |
| 6 | $SiO_2$ | 62.82 |
| 7 | $Nb_2O_5$ | 38.67 |
| 8 | $SiO_2$ | 60.98 |
| 9 | $Nb_2O_5$ | 37.60 |
| 10 | $SiO_2$ | 59.44 |
| 11 | $Nb_2O_5$ | 38.00 |
| 12 | $SiO_2$ | 58.78 |
| 13 | $Nb_2O_5$ | 37.97 |
| 14 | $SiO_2$ | 58.53 |
| 15 | $Nb_2O_5$ | 40.23 |
| 16 | $SiO_2$ | 58.92 |
| 17 | $Nb_2O_5$ | 38.82 |
| 18 | $SiO_2$ | 60.27 |
| 19 | $Nb_2O_5$ | 38.32 |
| 20 | $SiO_2$ | 59.84 |
| 21 | $Nb_2O_5$ | 37.68 |
| 22 | $SiO_2$ | 58.80 |
| 23 | $Nb_2O_5$ | 38.22 |
| 24 | $SiO_2$ | 59.84 |
| 25 | $Nb_2O_5$ | 38.60 |
| 26 | $SiO_2$ | 58.54 |
| 27 | $Nb_2O_5$ | 37.68 |
| 28 | $SiO_2$ | 58.92 |
| 29 | $Nb_2O_5$ | 37.72 |
| 30 | $SiO_2$ | 58.54 |
| 31 | $Nb_2O_5$ | 37.33 |
| 32 | $SiO_2$ | 59.03 |
| 33 | $Nb_2O_5$ | 38.34 |
| 34 | $SiO_2$ | 62.86 |
| 35 | $Nb_2O_5$ | 36.99 |
| 36 | $SiO_2$ | 59.47 |
| 37 | $Nb_2O_5$ | 36.93 |
| 38 | $SiO_2$ | 61.87 |
| 39 | $Nb_2O_5$ | 37.65 |
| 40 | $SiO_2$ | 59.42 |
| 41 | $Nb_2O_5$ | 36.45 |
| 42 | $SiO_2$ | 62.44 |
| 43 | $Nb_2O_5$ | 42.64 |
| 44 | $SiO_2$ | 62.64 |
| 45 | $Nb_2O_5$ | 35.58 |

TABLE 4-continued

| No. | Material of thin film | Film thickness (nm) |
|---|---|---|
| 46 | $SiO_2$ | 51.67 |
| 47 | $Nb_2O_5$ | 47.86 |
| 48 | $SiO_2$ | 107.56 |

Example 6

Retardation imparting antireflection layers were formed over both sides of a glass substrate (with an average thickness of 0.7 mm) by alternately stacking $Nb_2O_5$ and $SiO_2$ by sputtering. The layers were configured such that a retardation to be imparted to oblique incident light inclined from a direction perpendicular to a surface of the glass substrate by 15° by the retardation imparting antireflection layer on one side was 7.0 nm, and that to be imparted by the retardation imparting antireflection layer on the other side was 14.0 nm. The layer configuration on one side was as shown in Table 1 (a retardation of 7.0 nm), and the layer configuration on the other side was as shown in Table 4 (a retardation of 14. 0 nm). In this way, the layers were configured such that the total retardation to be imparted by the antireflection layers on both sides of the glass substrate would be 21.0 nm. Next, a first birefringent layer and a second birefringent layer were formed over the retardation imparting antireflection layer on one side through the same process as in Example 1. The average thickness (film thickness) of each birefringent layer was 160 nm. The Nx1'–Nx2' angle was 84°. Through the process described above, a retardation element used in a liquid crystal display device was produced.

Example 7

Retardation imparting antireflection layers were formed over both sides of a glass substrate (with an average thickness of 0.7 mm) by alternately stacking $Nb_2O_5$ and $SiO_2$ by sputtering. The layers were configured such that the retardation to be imparted to oblique incident light inclined from a direction perpendicular to a surface of the glass substrate by 15° was 28.0 nm in total. This was realized by forming the layers on both sides of the glass substrate with the layer configuration of Table 4 (a retardation of 14.0 nm). Next, a first birefringent layer and a second birefringent layer were formed over the antireflection layer on one side through the same process as in Example 1. The average thickness (film thickness) of each birefringent layer was 160 nm. The Nx1'–Nx2' angle was 84°. Through the process described above, a retardation element used in a liquid crystal display device was produced.

Comparative Example 1

An antireflection layer that would impart a retardation of substantially 0 nm to oblique incident light inclined from a direction perpendicular to a surface of a glass substrate by 15° was formed over one side of the glass substrate (with an average thickness of 0.7 mm) by alternately stacking $Nb_2O_5$ and $SiO_2$ by sputtering. Next, a first birefringent layer and a second birefringent layer were formed over the other side of the glass substrate through the same process as in Examples 1 and 2. The average thickness (film thickness) of each birefringent layer was 160 nm. The Nx1'–Nx2' angle was 84°. Through the process described above, a retardation element used in a liquid crystal display device was produced.

The retardation element of each of Examples 5 to 7 and Comparative Example 1, a first polarizer (MAIN POLARIZER manufactured by Dexerials Corporation), a second polarizer (MAIN POLARIZER manufactured by Dexerials Corporation), and a vertically aligned liquid crystal panel (a liquid crystal panel in which a vertically aligned liquid crystal material having a positive refractive index anisotropy and a negative dielectric constant anisotropy was injected, that had a liquid crystal layer in which Δn×d was 332 nm, where Δn was a specific refractive index and d was a liquid crystal layer thickness, and of which pretilt angle engineered by means of an aligned film formed by oblique deposition was 85°) were arranged as shown in FIG. 10, to thereby produce a liquid crystal display device. Then, a contrast of a projected image was measured.

Figure 22:
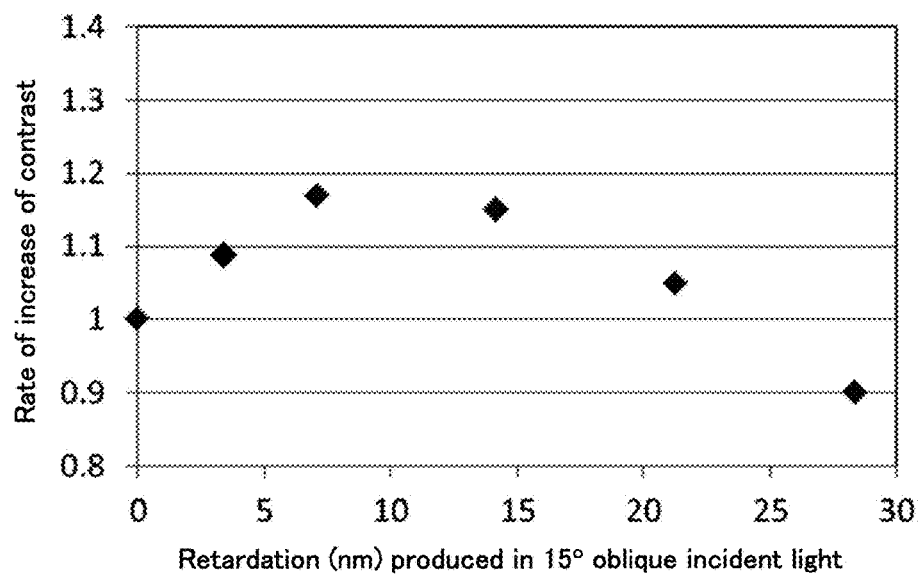
FIG. 22 is a graph showing a relationship between a retardation occurring in 15° oblique incident light, and contrast.

FIG. 22 is a diagram showing a relationship between retardation values imparted by the retardation element to light having an incident light angle of 15°, and a contrast of a projected image. The plotting at a retardation of 0 nm represents a contrast evaluation result when the retardation element of Comparative Example 1 was used. With this contrast set to 1.0, the vertical axis was standardized. It can be seen that the contrast obtained when a retardation imparting antireflection layer was introduced was better than when none was introduced. It is preferable that the retardation to be imparted be 28 nm or less. When it is greater than 28 nm, the contrast was poor to the contrary.

Figure 23A:
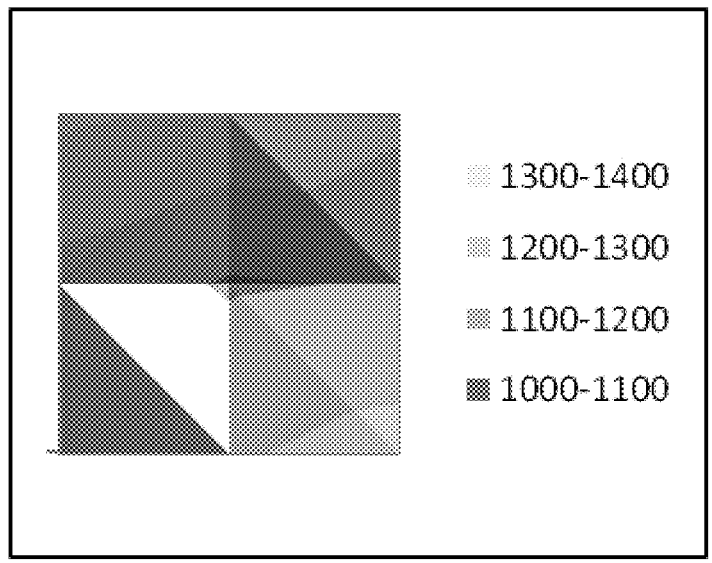
FIG. 23A is a diagram showing with contour lines, in-plane contrast distribution obtained with a retardation element of Example 1.
Figure 23B:
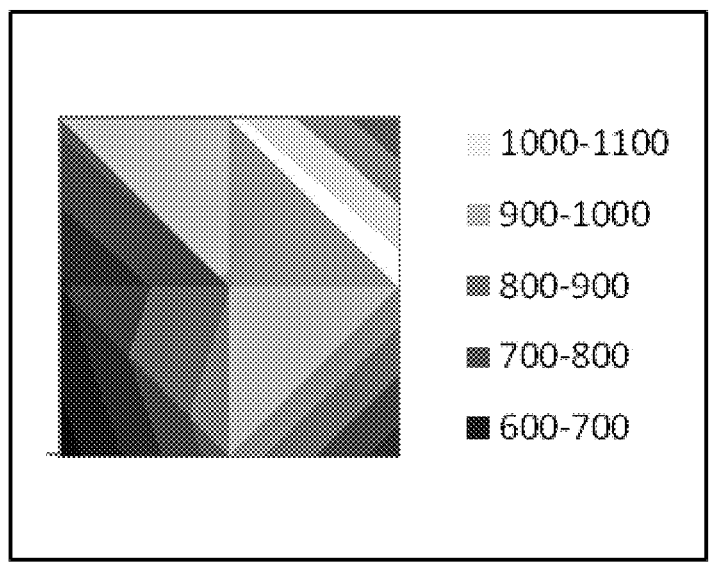
FIG. 23B is a diagram showing with contour lines, in-plane contrast distribution obtained with a retardation element of Comparative Example 1.

FIG. 23A and FIG. 23B are exemplary diagrams showing with contour lines, in-plane contrast distributions in projected images, which were obtained with a retardation element (FIG. 23A) in which, as in Example 1, a retardation imparting antireflection layer was formed so as to impart a retardation of 7.0 nm to oblique incident light inclined from a direction perpendicular to a surface of a glass substrate by 15°, and with a retardation element (FIG. 23B) in which, as in Comparative Example 1, a retardation imparting antireflection layer was formed so as to impart a retardation of substantially 0 nm to the same light as above. In FIG. 23B, a poor contrast was observed at end portions of the projected image (particularly, at the corners). On the other hand, in FIG. 23A, there was a tendency that the contrast distribution was uniform all over the screen. As described above, with the retardation imparting antireflection layer, it is possible to obtain a remarkable effect in improving the contrast distribution.

Comparative Example 2

For example, there is known a method of disposing a C-plate, which is another type of a retardation element, such that it is inclined from a liquid crystal panel.

A C-plate retardation element having Rth=−200 nm was formed over one side of a glass substrate (with an average thickness of 0.7 mm) by stacking seventy-two layers each having a thickness of 30 nm alternately with $Nb_2O_5$ and $SiO_2$ by sputtering. A contrast was measured in an optical system configuration as in FIG. 10.

Figure 24:
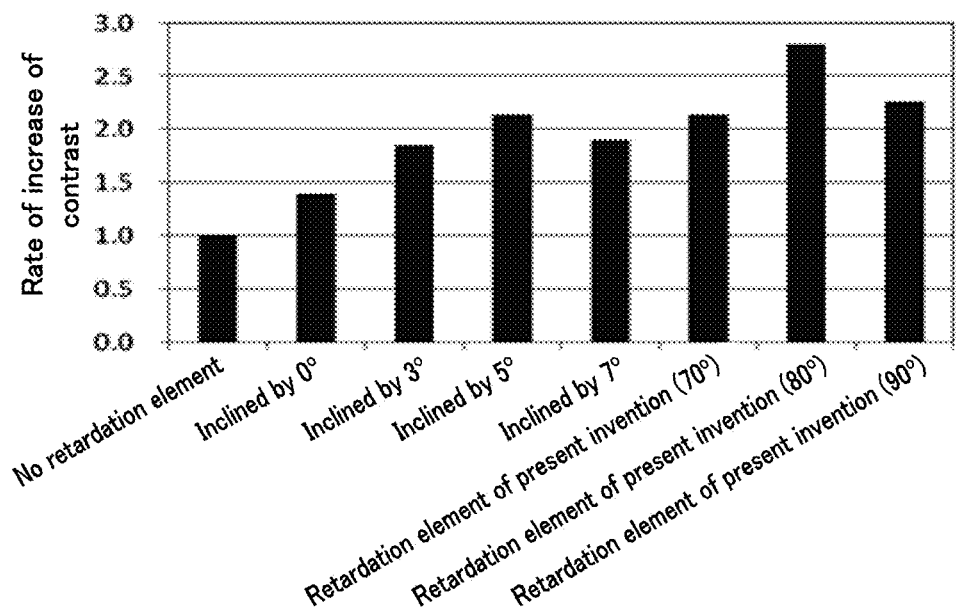
FIG. 24 is a graph showing a relationship between various retardation elements and contrast.

FIG. 24 shows a result of comparison of a contrast in a projected image, among:
(1) a case where no retardation element was used;
(2) a case where the C-plate described in Comparative Example 2 was disposed as inclined from a liquid crystal panel by from 3° to 7°; and
(3) a case where the retardation element of Example 1 (with a film thickness of 160 nm) was disposed in parallel with a liquid crystal panel.

These cases were set up in an optical system configuration as in FIG. 10.

Where the contrast obtained when no retardation element was used was assumed to be 1, the contrast was increased to 1.9 to 2.1 times greater in (2). Meanwhile, in the case of (3), which was the present invention, despite the retardation element was disposed in parallel with the liquid crystal panel, the contrast was increased to as high as 2.1 to 2.9 times greater when the Nx1'−Nx2' angle was from 70° to 90°. From this fact, it could be confirmed that the present invention could greatly save the installation space, and was also excellent in the contrast, even when compared with the conventional C-plate.

What is claimed is:
1. A retardation element, comprising:
a transparent substrate;
a retardation imparting antireflection layer formed of an optical multilayer film, and configured to impart a retardation to an oblique incident light ray among incident light rays, and to prevent the incident light rays from being reflected;
a first birefringent layer that comprises an optically anisotropic inorganic material, wherein an angle formed between a principal axis of refractive index anisotropy of the optically anisotropic inorganic material and a surface of the transparent substrate is not 90°; and
a second birefringent layer that comprises an optically anisotropic inorganic material, wherein an angle formed between a principal axis of refractive index anisotropy of the optically anisotropic inorganic material and the surface of the transparent substrate is not 90°,
wherein the second birefringent layer contacts the first birefringent layer such that an angle formed between a first line segment representing the principal axis of refractive index anisotropy of the first birefringent layer and a second line segment representing the principal axis of refractive index anisotropy of the second birefringent layer is neither 0° nor 180° when the first line segment and the second line segment are projected on the transparent substrate such that an end A of the first line segment at a side of the transparent substrate and an end B of the second line segment at a side of the transparent substrate coincide with each other, and
wherein the second birefringent layer has an average thickness approximately equal to an average thickness of the first birefringent layer.
2. The retardation element according to claim 1,
wherein the optically anisotropic inorganic material of the first birefringent layer is an oxide that comprises Si, Nb, Zr, Ti, La, Ta, or Al, or any combination thereof, and
wherein the optically anisotropic inorganic material of the second birefringent layer is an oxide that comprises Si, Nb, Zr, Ti, La, Ta, or Al, or any combination thereof.
3. The retardation element according to claim 1,
wherein the first birefringent layer or the second birefringent layer or both thereof satisfies the following formula: Nx>Ny>Nz, where Nx represents a refractive index in a direction parallel with the principal axis of refractive index anisotropy, Ny represents a refractive index in a direction perpendicular to Nx, and Nz represents a refractive index in a direction perpendicular to Nx and Ny.

4. The retardation element according to claim 1,
wherein the angle formed between the first line segment and the second line segment projected on the transparent substrate is 70° or greater but less than 90°.

5. The retardation element according to claim 1,
wherein a difference between a retardation of the first birefringent layer and a retardation of the second birefringent layer is less than 10 nm.

6. The retardation element according to claim 5,
wherein the retardation of the first birefringent layer and the retardation of the second birefringent layer are approximately equal to each other.

7. The retardation element according to claim 1,
wherein layers of the optical multilayer film have different average thicknesses.

8. The retardation element according to claim 1,
wherein the retardation imparting antireflection layer imparts a retardation of 28 nm or less to an oblique incident light ray inclined by 15° from a direction perpendicular to the transparent substrate.

9. The retardation element according to claim 1,
wherein materials of layers of the optical multilayer film are each an oxide that comprises Si, Nb, Zr, Ti, La, Ta, or Al, or any combination thereof.

10. The retardation element according to claim 1,
wherein the retardation imparting antireflection layer functions as an antireflection layer in a wavelength range of from 430 nm to 510 nm.

11. The retardation element according to claim 1,
wherein the retardation imparting antireflection layer functions as an antireflection layer in a wavelength range of from 510 nm to 590 nm.

12. The retardation element according to claim 1,
wherein the retardation imparting antireflection layer functions as an antireflection layer in a wavelength range of from 590 nm to 680 nm.

13. The retardation element according to claim 1,
wherein an angle formed between a bisector of the angle formed between the first line segment and the second line segment projected on the transparent substrate and one side of the transparent substrate is approximately 45°.

14. A liquid crystal display device, comprising:
a liquid crystal panel that comprises a substrate and a vertical alignment mode liquid crystal layer and is configured to modulate an incident flux of light, wherein the vertical alignment mode liquid crystal layer comprises liquid crystal molecules having a pretilt from a direction perpendicular to a principal surface of the substrate;
a first polarizer disposed on an incident side of the liquid crystal panel;
a second polarizer disposed on an emission side of the liquid crystal panel; and
the retardation element according to claim 1 disposed on an optical path between the liquid crystal panel and the second polarizer.

15. The liquid crystal display device according to claim 14,
wherein an imaginary line projected on the transparent substrate and representing a direction of inclination of the liquid crystal molecules from the direction perpendicular to a surface of the substrate due to the pretilt, and the bisector of the angle formed between the first line segment and the second line segment projected on the transparent substrate are approximately parallel with each other.

16. A projection display device, comprising:
a light source configured to emit light;
a projection optical system configured to project modulated light; and
the liquid crystal display device according to claim 14 disposed on an optical path between the light source and the projection optical system.

17. A method for producing the liquid crystal display device according to claim 14, comprising:
a method for producing the retardation element; and
disposing the retardation element on an optical path between the liquid crystal panel and the second polarizer such that one side of the substrate of the liquid crystal panel and one side of the retardation element approximately coincide with each other,
wherein the method for producing the retardation element comprises:
forming the first birefringent layer over any of the transparent substrate and the retardation imparting antireflection layer by oblique deposition; and
forming the second birefringent layer over the first birefringent layer by oblique deposition.

18. A method for producing the retardation element according to claim 1, comprising:
forming the first birefringent layer over any of the transparent substrate and the retardation imparting antireflection layer by oblique deposition; and
forming the second birefringent layer over the first birefringent layer by oblique deposition.

* * * * *